United States Patent
Yamanaka et al.

(10) Patent No.: US 7,643,180 B2
(45) Date of Patent: Jan. 5, 2010

(54) IMAGE PROCESSING AND DISPLAY APPARATUS AND METHOD FOR TONE RESOLUTION EXPANSION OF DIGITAL IMAGES

(75) Inventors: Satoshi Yamanaka, Tokyo (JP); Yoshiaki Okuno, Tokyo (JP); Jun Someya, Tokyo (JP)

(73) Assignee: Mitsubishi Kabushiki Kaisha, Tokyo (JP)

( * ) Notice: Subject to any disclaimer, the term of this patent is extended or adjusted under 35 U.S.C. 154(b) by 649 days.

(21) Appl. No.: 11/363,329

(22) Filed: Feb. 28, 2006

(65) Prior Publication Data

US 2006/0197993 A1    Sep. 7, 2006

(30) Foreign Application Priority Data

Mar. 1, 2005    (JP) .............................. 2005-055729

(51) Int. Cl.
   *H04N 1/409* (2006.01)
(52) U.S. Cl. ...................... 358/3.26; 358/3.27; 382/264
(58) Field of Classification Search ................ 358/3.01, 358/3.08, 3.21, 3.26, 3.27; 382/264
   See application file for complete search history.

(56) References Cited

U.S. PATENT DOCUMENTS 5,408,338 A  *  4/1995  Koike .......................... 358/448
5,497,180 A  *  3/1996  Kawakami et al. .......... 347/131
5,506,699 A  *  4/1996  Wong .......................... 358/3.08
5,572,606 A  *  11/1996  Tanioka ....................... 358/3.08

FOREIGN PATENT DOCUMENTS

| JP | 10-84481 A | 3/1998 |
|---|---|---|
| JP | 10-155089 A | 6/1998 |
| JP | 11-355561 A | 12/1999 |
| JP | 2002-112038 A | 4/2002 |
| JP | 2004-301976 A | 10/2004 |
| JP | 2005-516260 A | 6/2005 |

* cited by examiner

*Primary Examiner*—Thomas D Lee
(74) *Attorney, Agent, or Firm*—Birch, Stewart, Kolasch & Birch, LLP

(57) ABSTRACT

A tone step detector detects whether the tone of n-bit input image data varies gradually, and generates a tone processing control signal indicating that a tone step is contained. A bit shifter bit-shifts the n-bit input image data to the left by $\alpha$ bits, to generate $(n+\alpha)$-bit image data. A tone processor smoothes the image data of the $(n+\alpha)$-bit image data generated by the bit shifter, in the region where the tone processing control signal indicates that a tone step is contained, to generate $(n+\alpha)$-bit image data having been smoothed in the above-mentioned region. Because of the selective smoothing, degradation in the image quality due to quantization is reduced even when an analog image signal whose tone varies gradually is input.

21 Claims, 26 Drawing Sheets

TONE RESOLUTION EXPANDER

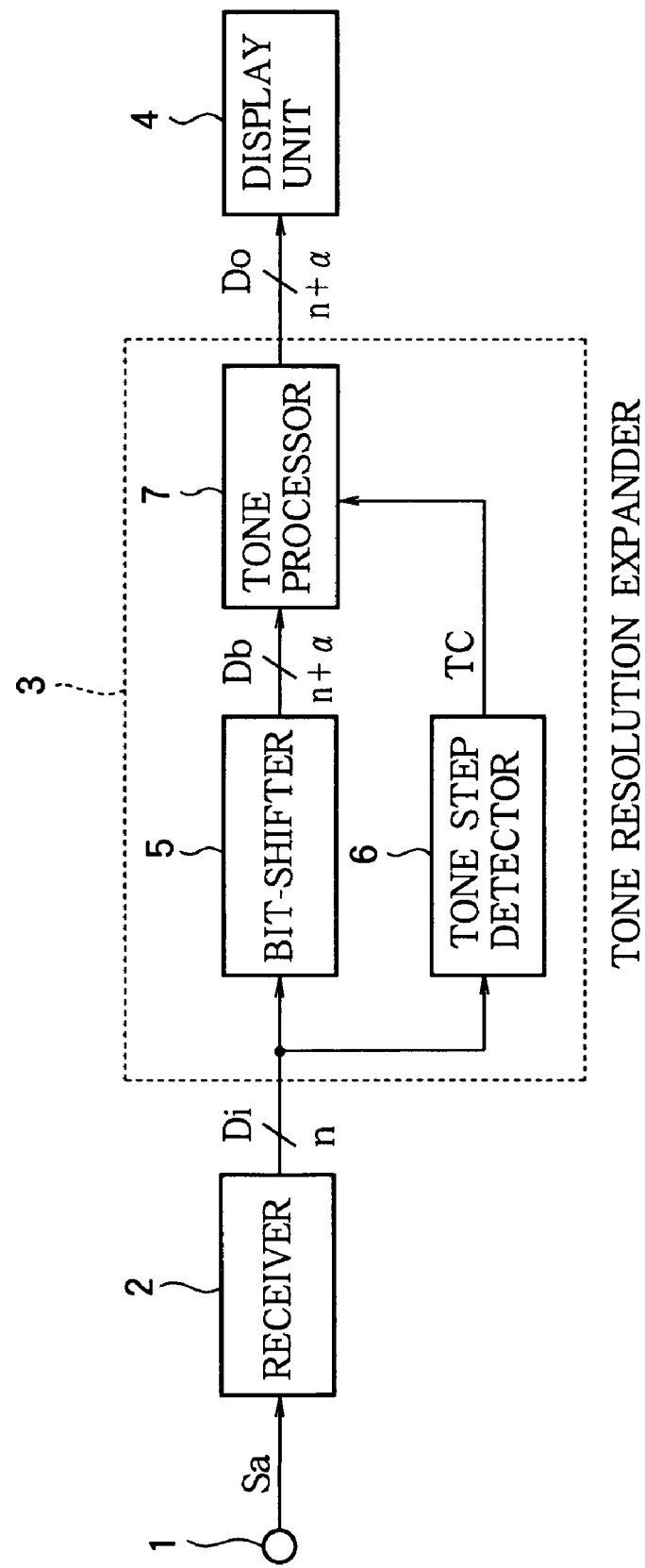

| 0 | 1 |
|---|---|
| 2 | 3 |

| 17 | 21 |
|----|----|
| 3  | 9  |

| 17 | 22 |
|----|----|
| 5  | 12 |

| 4 | 5 |
|---|---|
| 1 | 3 |

FIG.27A

| A | B |
|---|---|
| C | D |

FIG.27B

| 17 | |
|---|---|
| | |

FIG.27C

| 4 | |
|---|---|
| | |

FIG.27D

| | 3/8 |
|---|---|
| 3/8 | 2/8 |

IMAGE PROCESSING AND DISPLAY APPARATUS AND METHOD FOR TONE RESOLUTION EXPANSION OF DIGITAL IMAGES

BACKGROUND OF THE INVENTION

The present invention relates to an image processing apparatus, image processing method, image display apparatus, and image display method, and in particular to a technique for tone resolution expansion (i.e., tone resolution refinement) of digital images. The term "tone resolution expansion" is used to mean increase in the number of gray scale levels or tone levels, i.e., conversion of image data for each pixel represented by a first number of bits, to image data for each pixel represented by a second number of bits, the second number being greater than the first number. The "tone level" or "gray scale" refers to both color data and black/white data.

Various forms of tone level conversion or tone conversion are applied to the image, as part of the image processing. A problem associated with the tone conversion is occurrence of "tone jump." The "tone jump" (which may also be called a tone value skip) is a phenomenon in which the image level varies step-wise between adjacent regions (or between adjacent pixels), and least one image level (tone value) is skipped or is absent. See for instance Japanese Patent Application Kokai Publication No. H10-84481 (Page 3, FIGS. 1 and 2.)

When an analog image signal is converted into a digital image signal, continuous tones become discrete by the quantization. When the resolution of the quantization is low (the number of the bits is small), there will be a greater number of tones which do not appear after the quantization, and the degradation of the image quality due to digitization is noticeable. If the resolution of the quantization is made high, the degradation of the image quality is alleviated, but the A/D converter used for the digitization becomes expensive.

According to the above-mentioned publication, a tone jump is perceived to the human eye as a pseudo contour.

A conventional analog-to-digital conversion is associated with a problem that, when an analog image signal having a gray scale or tone varying gradually is converted to a digital image data, the tone in the digital image data varies stepwise by "1," so that the degradation in the image quality due to the quantization is prominent. For instance, when image data of an evening sunset glow, sea, or the like is converted to the digital image data, the part where the tone of the digital image data varies stepwise by "1" appears to be a pseudo contour.

Also, when non-linear tone conversion, e.g., gamma conversion for compensating the non-linearity of the input signal-to-light emitting intensity conversion characteristics of a display device, is applied to the digital image data, there may be tones (tone values) which do not appear in the image data after the non-linear tone conversion.

SUMMARY OF THE INVENTION

An object of the invention is to reduce the degradation in the image quality due to tone conversion.

An image processing apparatus according to the invention includes a tone step detector for detecting whether a tone of an n-bit image data varies gradually, with n being a positive integer, and generating a tone processing control signal indicating that a tone step in a region in which the detection is made. A bit shifter bit-shifts the n-bit image data by a bits, with $\alpha$ being a positive integer, to generate $(n+\alpha)$-bit image data. A tone processor generates $(n+\alpha)$-bit image data by smoothing the $(n+\alpha)$-bit image data generated by the bit shifter, in a region where the tone processing control signal indicates that a tone step is contained.

According to the invention, the region in which the tone of the input image data varies gradually is detected, and the image data in the detected region is smoothed. As a result, the number of tones can be increased, without losing the sharpness of the image in regions where the variation in the tone is abrupt, such as at a contour, or the dynamic range is partially high, and the degradation in the image quality due to tone conversion can be reduced.

BRIEF DESCRIPTION OF THE DRAWINGS

FIG. 1 is a drawing showing a configuration of an image display apparatus according Embodiment 1;

FIGS. 27A to 27D are drawings showing an example of error diffusion processing according to Embodiment 3;

DETAILED DESCRIPTION OF THE INVENTION

Figure 2A:
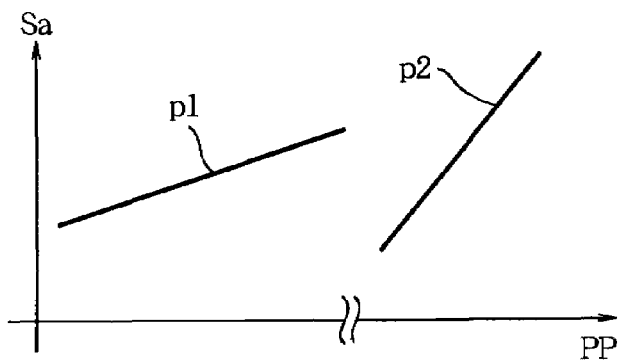
FIGS. 2A to 2D are diagrams for explaining the operation of the image display apparatus according to Embodiment 1.

Embodiments of the invention will now be described with reference to the drawings.

Embodiment 1

FIG. 1 is a diagram showing the configuration of an image display apparatus according to Embodiment 1. The image display apparatus according to Embodiment 1 comprises an image processing apparatus comprising an input terminal 1, receiver 2, and a tone resolution expander 3, and a display unit 4.

An analog image signal Sa is input via the input terminal 1 to the receiver 2. The receiver 2 converts the analog image signal Sa to n-bit image data Di, and supplies it to the tone resolution expander 3. The tone resolution expander 3 comprises a bit shifter 5, a tone step detector 6, and a tone processor 7, and converts the input n-bit image data Di to (n+α)-bit image data Do, and supplies the (n+α)-bit image data Do to the display unit 4, where n and α are positive integers not smaller than "1." The tone resolution expander thus increases the number of gray scale levels or tone levels represented by the image data. The display unit 4 displays an image based on the (n+α)-bit image data Do.

In this embodiment, the receiver 2 is assumed to be an A/D converter for converting the analog image signal into a digital image signal. The receiver 2 may be provided with a tuner, and may digitizes an analog image signal having been produced within the receiver 2. Alternatively, the receiver 2 may be used as a digital interface, and may receive digital data from the input terminal 1, and produce n-bit image data Di.

Figure 2B:
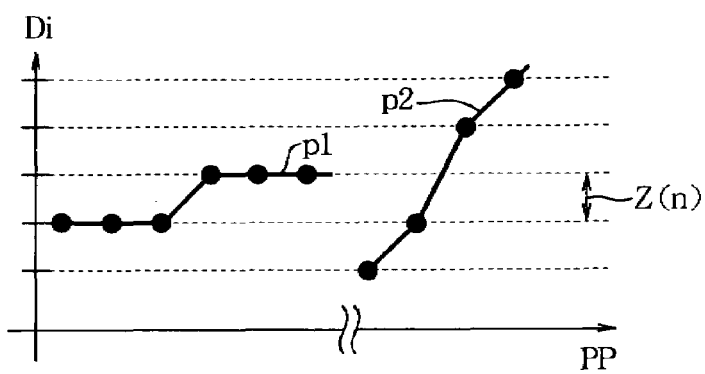
Figure 2C:
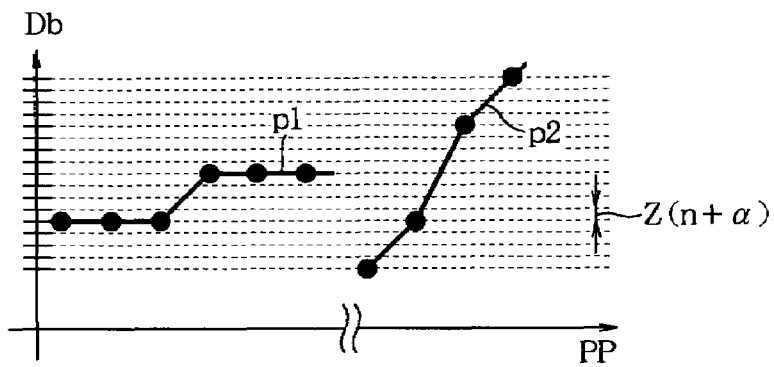
Figure 2D:
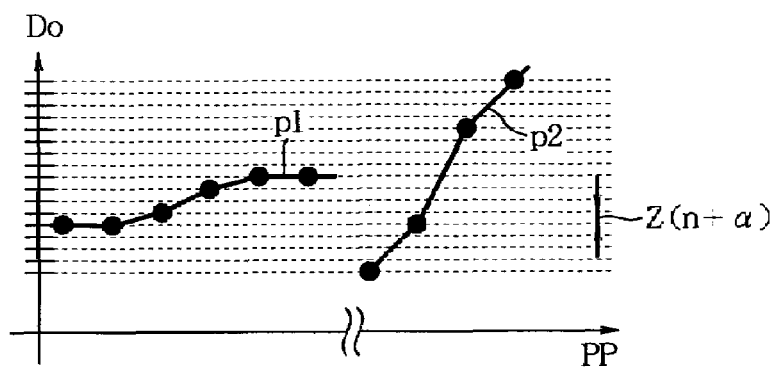

FIGS. 2A to 2D are diagrams for explaining the operation of the image display apparatus according to Embodiment 1. FIG. 2A shows an example of the analog image signal Sa input at the input terminal 1. FIG. 2B shows n-bit image data Di corresponding to the image signal Sa shown in FIG. 2A. FIG. 2C shows (n+α)-bit image data Db obtained by bit-shifting the image data Di to the left (toward more significant bits) by α bits, at the bit shifter 5. FIG. 2D shows (n+α)-bit image data Do which is output by the tone processor 7, and which corresponds to the image data Db shown in FIG. 2C. The horizontal axes in FIGS. 2A to 2D represent the pixel position PP, and the vertical axis in FIG. 2A represents the analog tone value, and the vertical axes in FIGS. 2B to 2D represent the digital tone value. $Z(n)$ in FIG. 2B represents the resolution or step size of n-bit image data, while $Z(n+\alpha)$ in FIG. 2C and FIG. 2D represents the resolution or step size of (n+α)-bit image data.

The operation of the image display apparatus according to Embodiment 1 will now be described in detail with reference to FIG. 1, and FIGS. 2A to 2D.

The analog image signal Sa shown in FIG. 2A is supplied via the input terminal 1 to the receiver 2. The receiver 2 converts the image signal Sa shown in FIG. 2A to n-bit image data Di shown in FIG. 2B, and supplies the n-bit image data Di to the bit shifter 5 and the tone step detector 6.

In the illustrated example, in a region p1 of the image signal Sa shown in FIG. 2A, the tone varies gradually. However, because the quantization resolution of the digital image data Di against the tone variation is low (the number of bits is small), the region p1 of the image signal Sa is converted to two tone values in the image data Di shown in FIG. 2B. A part where the tone varies stepwise by "1" within a region having a certain width, such as the region p1 shown in FIG. 2B, i.e., a region consisting of a predetermined number of pixels, is defined as a tone step.

A tone step occurs in a part where the tone variation is small against the number of pixels, i.e., where the tone increases or decreases monotonically with a gradient satisfying a condition $Y/X<1$, with X representing a predetermined number of pixels, and Y represents the tone variation over the X pixels.

In the region p2 of the image signal Sa shown in FIG. 2A, the tone varies abruptly. In the region p2 of the image data Di shown in FIG. 2B, $Y/X>1$ so that no tone step is present.

The bit shifter 5 bit-shifts the image data Di shown in FIG. 2B to the left by α bits to output (n+α)-bit image data Db shown in FIG. 2C.

The tone step detector 6 examines or detects whether a tone step is present in the image data Di shown in FIG. 2B. When the image data Di shown in FIG. 2B is examined, a tone step is detected in the region p1, while no tone step is detected in the region p2. The tone step detector 6 produces a tone processing control signal TC indicating whether a tone step is contained in the region where the tone step has been detected. For instance, the tone processing control signal TC assumes a first value, e.g., "1," when it indicates that a tone step is contained, and assumes a second value, e.g., "0," when it indicates that no tone step is contained. In the example under consideration, the tone processing control signal TC assumes the first value for the region p1 of the image data Db. The tone processing control signal TC is supplied to the tone processor 7.

The tone processor 7 smoothes the image signal in the region where the tone processing control signal indicates that a tone step is contained, and outputs the image data Db as is, i.e., without smoothing, for other regions. Accordingly, image data Do shown in FIG. 2D, obtained by smoothing the image data Db shown in FIG. 2C only in the region p1 is output.

The tone processor 7 performs the smoothing by using a low-pass filter (LPF). In the present embodiment, the LPF is in the form of a one-dimensional averaging filter outputting the simple average of K successive pixels (K being an integer) as the smoothed tone value of the pixel in question. The average can be obtained by:

$$Do(i)=(Db(i-(K+1)/2)+\ldots+Db(i+(K+1)/2))/K \quad (1)$$

Other types of LPFs may be used for the smoothing, to obtain similar results.

By detecting the region where the tone varies gradually, and smoothing the image data in the region having been found to contain a tone step, it is possible to increase the number of tones, without losing the sharpness of the image possessed by the region where the tone variation is abrupt, such as a contour region, or the region where the dynamic range is locally high. As a result, it is possible to reduce the degradation in the image quality due the quantization.

Next, the tone step detector 6 detecting the tone step using the first derivative data will be described.

Figure 3:
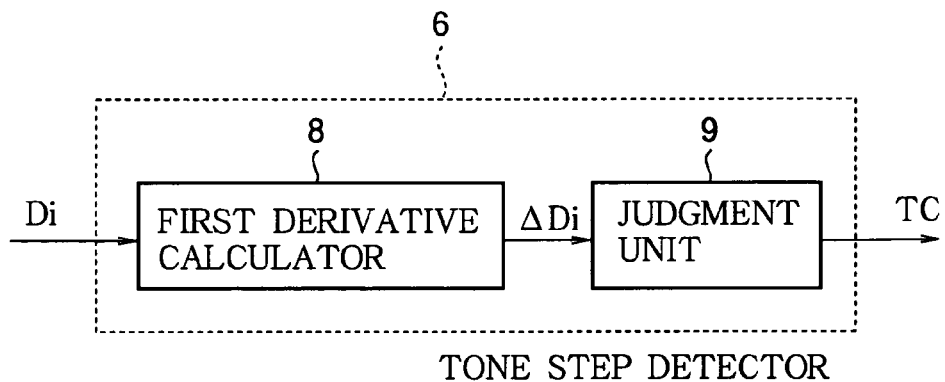
FIG. 3 is a drawing showing the configuration of a tone step detector according to Embodiment 1.

FIG. 3 shows the configuration of the tone step detector 6 detecting tone steps using the first derivative data. The tone step detector 6 comprises a first derivative calculator 8 and a judgment unit 9. The image data Di is input to the first derivative calculator 8, which calculates a first derivative of the image data Di, and outputs first derivative data $\Delta Di$ to the judgment unit 9. The judgment unit 9 performs judgment on the first derivative data $\Delta Di$ with regard to tone detection condition, to output a tone processing control signal TC.

Figure 4A:
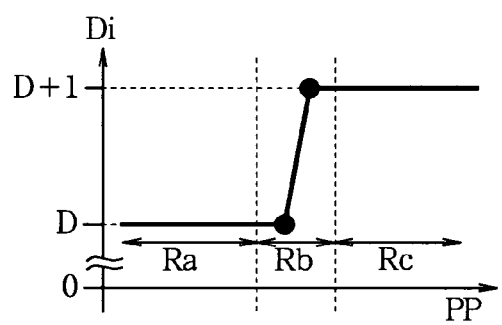
FIGS. 4A to 4D are drawings for explaining the operation of the tone step detector according to Embodiment 1.
Figure 4B:
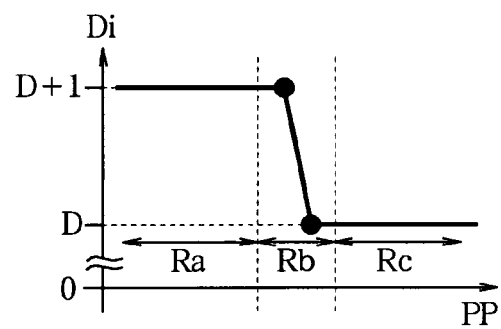
Figure 4C:
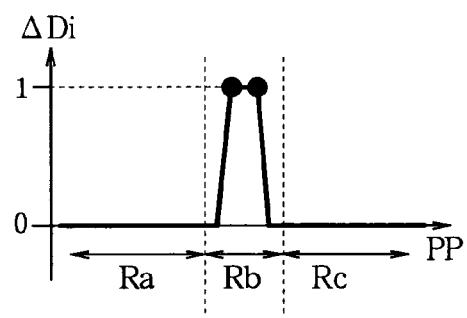
Figure 4D:
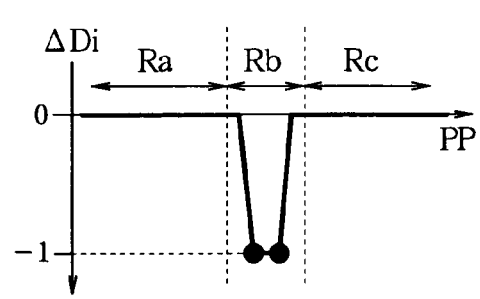

FIGS. 4A to 4D illustrate a method for detecting a tone step using the first derivative data. FIGS. 4A and 4B show image data Di in the region containing a tone step, while FIGS. 4C and 4D show first derivative data $\Delta Di$ corresponding to the image data Di shown in FIGS. 4A and 4B.

At the tone step, tone varies stepwise by "1" as shown in FIGS. 4A and 4B, so that a step region can be divided into a region Rb where the tone varies by "1," and regions Ra and Rc on the left and right sides of the region Rb where the tone does not vary.

The operation of the tone step detector 6 to detect tone steps using the first derivative data will be described in detail with reference to FIG. 3, and FIGS. 4A to 4D.

The first derivative calculator 8 calculates the first derivative of the image data Di shown in FIG. 4A, in accordance with the following equation (2);

$$\Delta Di(i)=Di(i+1)-Di(i-1) \quad (2)$$

and outputs the first derivative data $\Delta Di$ shown in FIG. 4C. It also calculates the first derivative of the image data Di shown in FIG. 4B using the equation (2), to output the first derivative data $\Delta Di$ shown in FIG. 4D. The variable i in the equation represents the pixel number indicating the position of the pixel in question, for which the first derivative is calculated (the pixel number being assigned sequentially from one end of the row of pixels toward the other end).

When the first derivative of the image data Di containing a tone step where the tone increases just by "1" as shown in FIG. 4A is calculated, the first derivative data $\Delta Di(i)$ in the regions Ra and Rc where the tone does not vary become "0," and the first derivative data $\Delta Di(i)$ in the region Rb becomes "1." When the image data Di containing a tone step where the tone decreases just by "1" as shown in FIG. 4B is calculated, the first derivative data $\Delta Di(i)$ in the regions Ra and Rc where the tone does not vary become "0," while the first derivative data $\Delta Di(i)$ in the region Rb becomes "−1."

As has been described, the judgment unit 9 judges that the region in question is a step region if there is a tone step where the first derivative data $\Delta Di(i)$ of two successive pixels are both "1," or both "−1," and there are regions on both the left and right sides of the tone step where the first derivative data $\Delta Di(i)$ is both "0," and outputs a tone processing control signal TC indicating that a tone step is contained in the region for which the judgment has been made.

The operation of the tone resolution expander 3 will next be described with reference to examples.

Figure 5A:
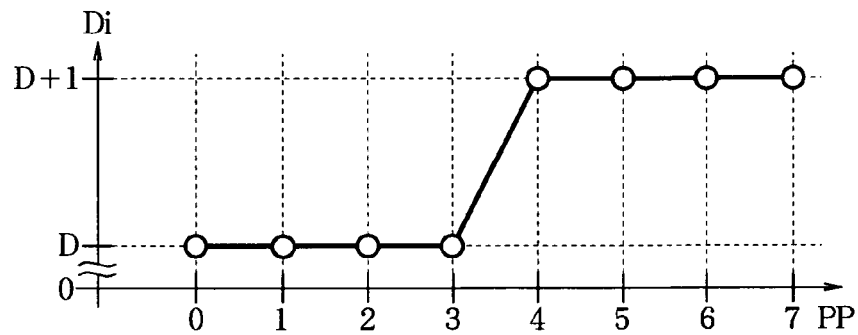
FIGS. 5A to 5D are drawings for explaining an example of tone resolution expansion according to Embodiment 1.
Figure 5B:
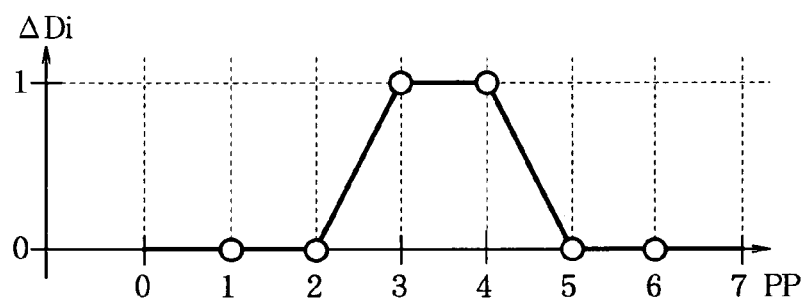
Figure 5C:
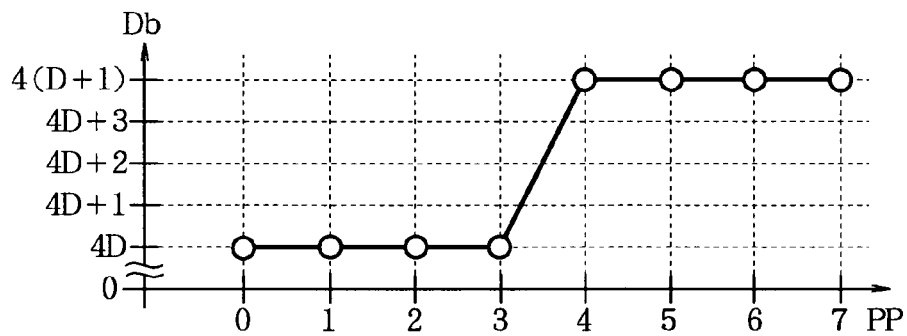
Figure 5D:
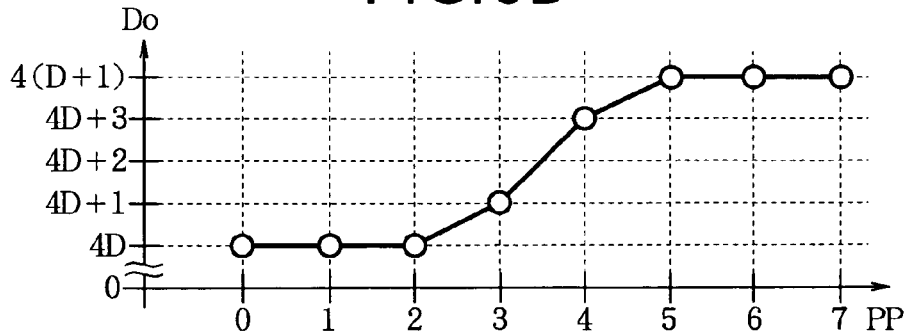

FIGS. 5A to 5D illustrate an example of tone resolution expansion on image data containing a tone step. FIG. 5A shows image data Di, FIG. 5B shows first derivative data $\Delta Di$ of the image data Di shown in FIG. 5A, calculated by the first derivative calculator 8, FIG. 5C shows (n+2)-bit image data Db obtained by bit-shifting the image data Di shown in FIG. 5A to the left by 2 bits, by means of the bit shifter 5. FIG. 5D shows (n+2)-bit image data Do output by the tone processor 7, corresponding to the image data Db shown in FIG. 5C.

An example will next be described with reference to FIG. 1, FIG. 3 and FIGS. 5A to 5D. In the example, it is assumed that $\alpha=2$, and the tone resolution expander 3 converts the n-bit image data Di to (n+2)-bit image data Do.

The pixel position PP of the image data Di shown in FIG. 5A is identified as 0 to 7, and the tone at each pixel position PP is assumed to be Di(0)=D, Di(1)=D, Di(2)=D, Di(3)=D, Di(4)=D+1, Di(5)=D+1, Di(6)=D+1, Di(7)=D+1.

The image data Di is input to the bit shifter 5 and the tone step detector 6. The bit shifter 5 bit-shifts the image data Di shown in FIG. 5A to the left by two bits, and outputs the image data Db shown in FIG. 5C to the tone processor 7. The tone of the image data Db at the pixel positions 0 to 7 is given by Db(0)=4D, Db(1)=4D, Db(2)=4D, Db(3)=4D, Db(4)=4(D+1), Db(5)=4(D+1), Db(6)=4(D+1), Db(7)=4(D+1)

In the tone step detector 6, the image data Di is input to the first derivative calculator 8, which calculates a first derivative of the image data Di shown in FIG. 5A in accordance with the equation (2), and outputs first derivative data $\Delta Di$ shown in FIG. 5B to the judgment unit 9. The first derivative data $\Delta Di(i)$ at the pixel positions 1 to 6 is given by:

$$\Delta Di(1)=Di(2)-Di(0)=D-D=0,$$

$$\Delta Di(2)=Di(3)-Di(1)=D-D=0,$$

$$\Delta Di(3)=Di(4)-Di(2)=(D+1)-D=1,$$

$$\Delta Di(4)=Di(5)-Di(3)=(D+1)-D=1,$$

$$\Delta Di(5)=Di(6)-Di(4)=(D+1)-(D+1)=0,$$

$$\Delta Di(6)=Di(7)-Di(5)=(D+1)-(D+1)=0.$$

The judgment unit 9 judges that the pixel positions 1 to 6 in FIG. 5A constitute a step region from the fact that: $\Delta Di(1)=0$, $\Delta Di(2)=0$, $\Delta Di(3)=1$, $\Delta Di(4)=1$, $\Delta Di(5)=0$, $\Delta Di(6)=0$, so that the pixels at pixel positions 3 and 4 are at a tone step because $\Delta Di(i)=1$ for the pixel positions 3 and 4, and the pixels at pixel positions 1, 2, 5 and 6, which are on both of the left and right sides of the tone step, form regions where $\Delta Di(i)=0$, and outputs a tone processing control signal TC indicating that a tone step is contained in the image data Db shown in FIG. 5C. The tone processing control signal TC is supplied to the tone processor 7.

As the tone processing control signal TC indicates that a tone step is contained in the image data Db shown in FIG. 5C, the tone processor 7 smoothes the image data Db in the region shown in FIG. 5C, to output the image data Do shown in FIG. 5D. The image data Do(i) at the pixel positions 1 to 6 is produced by an averaging filtering operation represented by the following equation obtained by applying K=3 in the equation (1):

$$Do(i) = (Db(i-1) + Db(i) + Db(i+1))/3.$$

For i = 1, 2, 3, 4, 5, 6, $$Do(1) = (Db(0) + Db(1) + Db(2))/3$$
$$= (4D + 4D + 4D)/3$$
$$= 4D,$$

$$Do(2) = (Db(1) + Db(2) + Db(3))/3$$
$$= (4D + 4D + 4D)/3$$
$$= 4D,$$

$$Do(3) = (Db(2) + Db(3) + Db(4))/3$$
$$= (4D + 4D + 4(D+1))/3$$
$$= 4D + 1,$$

$$Do(4) = (Db(3) + Db(4) + Db(5))/3$$
$$= (4D + 4(D+1) + 4(D+1))/3$$
$$= 4D + 3,$$

$$Do(5) = (Db(4) + Db(5) + Db(6))/3$$
$$= (4(D+1) + 4(D+1) + 4(D+1))/3$$
$$= 4(D+1),$$

$$Do(6) = (Db(5) + Db(6) + Db(7))/3$$
$$= (4(D+1) + 4(D+1) + 4(D+1))/3$$
$$= 4(D+1)$$

In the example, the fractions (digits to the right of the decimal point) smaller than 0.5 is omitted, while the fractions not smaller than 0.5 is counted.

Figure 6:
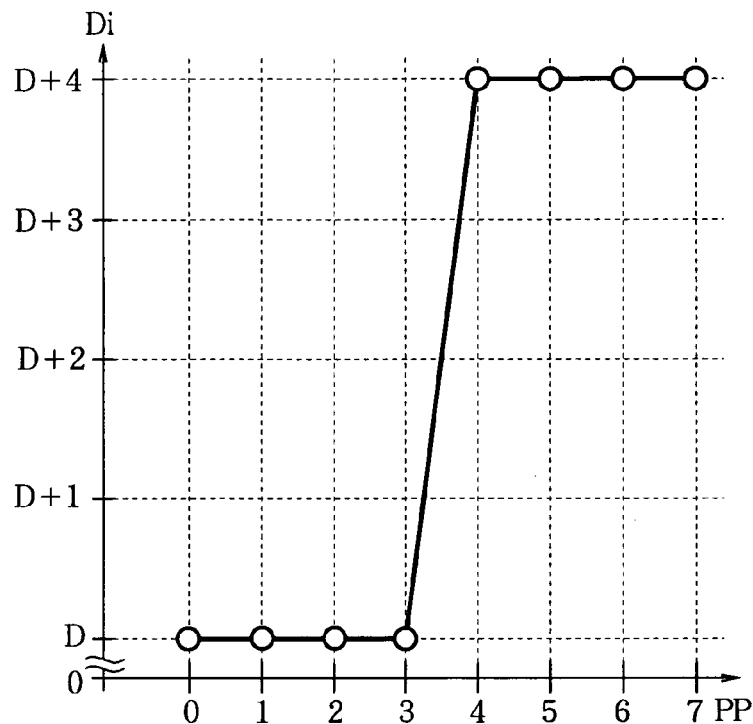
FIG. 6 is a drawing showing image data Di in an example of the tone resolution expansion according to Embodiment 1.
Figure 7:
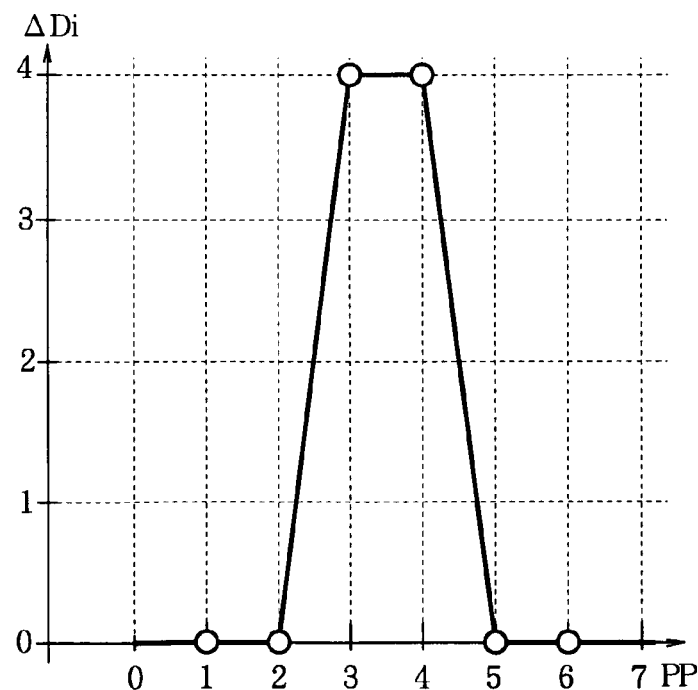
FIG. 7 is a drawing showing first derivative data $\Delta Di$ of the image data Di shown in FIG. 6, calculated by the first derivative calculator 8, in an example of the tone resolution expansion according to Embodiment 1.
Figure 8:
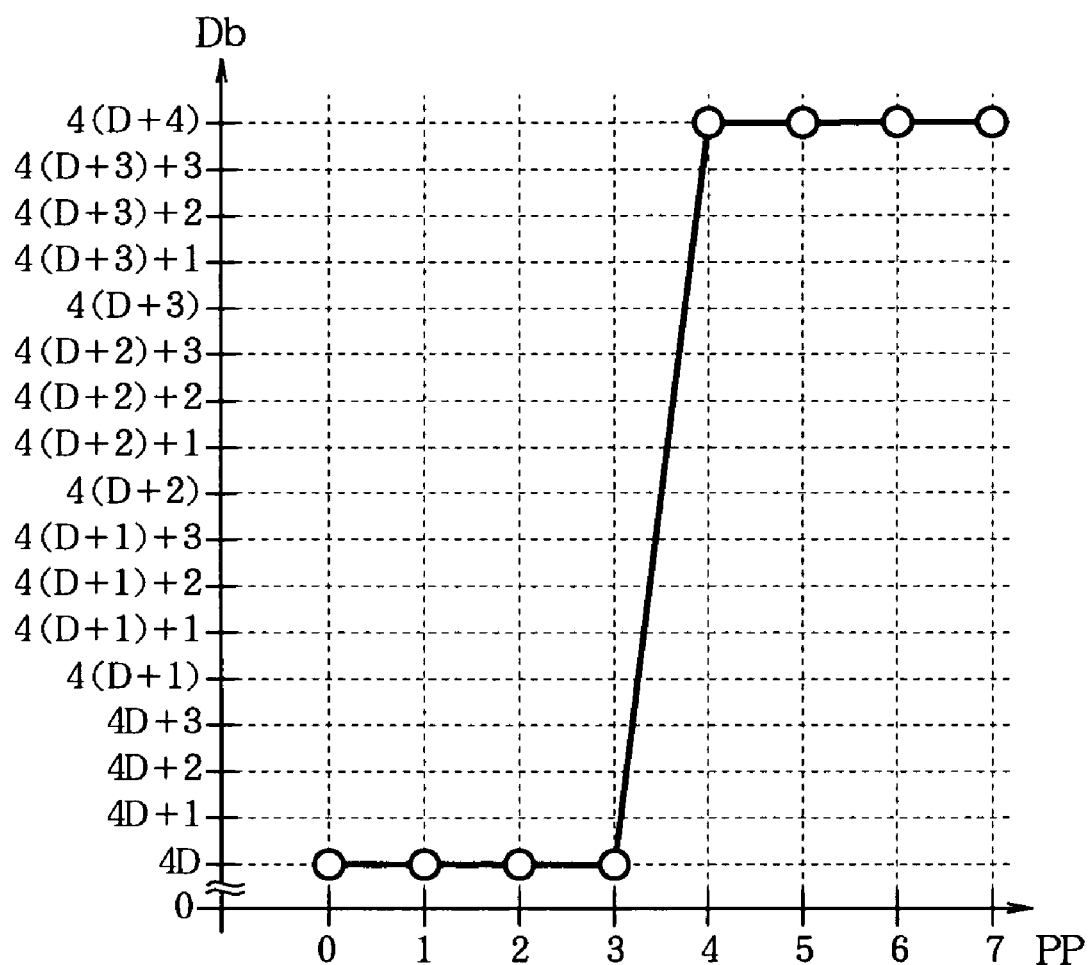
FIG. 8 is a drawing showing $(n+2)$-bit image data Db obtained by bit-shifting the image data Di shown in FIG. 6, to the left by two bits, by means of a bit shifter 5, in an example of the tone resolution expansion according to Embodiment 1.

FIG. 6 to FIG. 8 show an example of tone resolution expansion for image data which does not contain a tone step. FIG. 6 shows image data Di, FIG. 7 shows first derivative data ΔDi of the image data Di shown in FIG. 6, calculated by the first derivative calculator 8, and FIG. 8 shows (n+2)-bit image data Db obtained by bit-shifting the image data Di⁻ shown in FIG. 6 to the left by two bits, by means of the bit shifter 5.

An example will be described with reference to FIG. 1, FIG. 3, FIG. 6, FIG. 7, and FIG. 8. It is assumed that the pixel positions PP of the image data Di shown in FIG. 6 are identified by 0 to 7, and the tone of the image data Di at each pixel position is given by: Di(0)=D, Di(1)=D, Di(2)=D, Di(3)=D, Di(4)=D+4, Di(5)=D+4, Di(6)=D+4, Di(7)=D+4.

The image data Di is input to the bit shifter 5 and the tone step detector 6. The bit shifter 5 bit-shifts the image data Di shown in FIG. 6 to the left by two bits, to output the image data Db shown in FIG. 8 to the tone processor 7. The tone of the image data Db at the pixel positions 0 to 7 is given by: Db(0)=4D, Db(1)=4D, Db(2)=4D, Db(3)=4D, Db(4)=4(D+4), Db(5)=4(D+4), Db(6)=4(D+4), Db(7)=4(D+4).

In the tone step detector 6, the image data Di is input to the first derivative calculator 8, which uses the equation (2) to calculate the first derivative of the image data Di shown in FIG. 6, and outputs the first derivative data ΔDi shown in FIG. 7, to the judgment unit 9. The first derivative data ΔDi(i) at the pixel positions 1 to 6 is given by:

$$\Delta Di(1)=Di(2)-Di(0)=D-D=0,$$

$$\Delta Di(2)=Di(3)-Di(1)=D-D=0,$$

$$\Delta Di(3)=Di(4)-Di(2)=(D+4)-D=4,$$

$$\Delta Di(4)=Di(5)-Di(3)=(D+4)-D=4,$$

$$\Delta Di(5)=Di(6)-Di(4)=(D+4)-(D+4)=0,$$

$$\Delta Di(6)=Di(7)-Di(5)=(D+4)-(D+4)=0.$$

The judgment unit 9 judges that no tone step is contained in the image data Di shown in FIG. 6 from the fact that: ΔDb(1)=0, ΔDb(2)=0, ΔDb(3)=4, ΔDb(4)=4, ΔDb(5)=0, ΔDb(6)=0, so that the pixel positions 1 to 6 do not have two successive pixels for which ΔDi(i)=1, or −1.

As the tone processing control signal TC indicates that no tone step is contained in the image data Di shown in FIG. 6, the tone processor 7 outputs the image data Db shown in FIG. 8, as the image data Do, as is, i.e., without smoothing the image data Db.

As has been described, tone step detection can be achieved using the first derivative of the input image data.

Description has been made on the tone resolution expansion of the image data in the horizontal direction. Tone resolution expansion of the image data in the vertical direction can be made in a similar manner.

It is also possible to conduct tone resolution expansion both in the horizontal and vertical directions, by carrying out the tone resolution expansion in the horizontal direction, and tone resolution expansion in the vertical direction, one after another.

Figure 9:
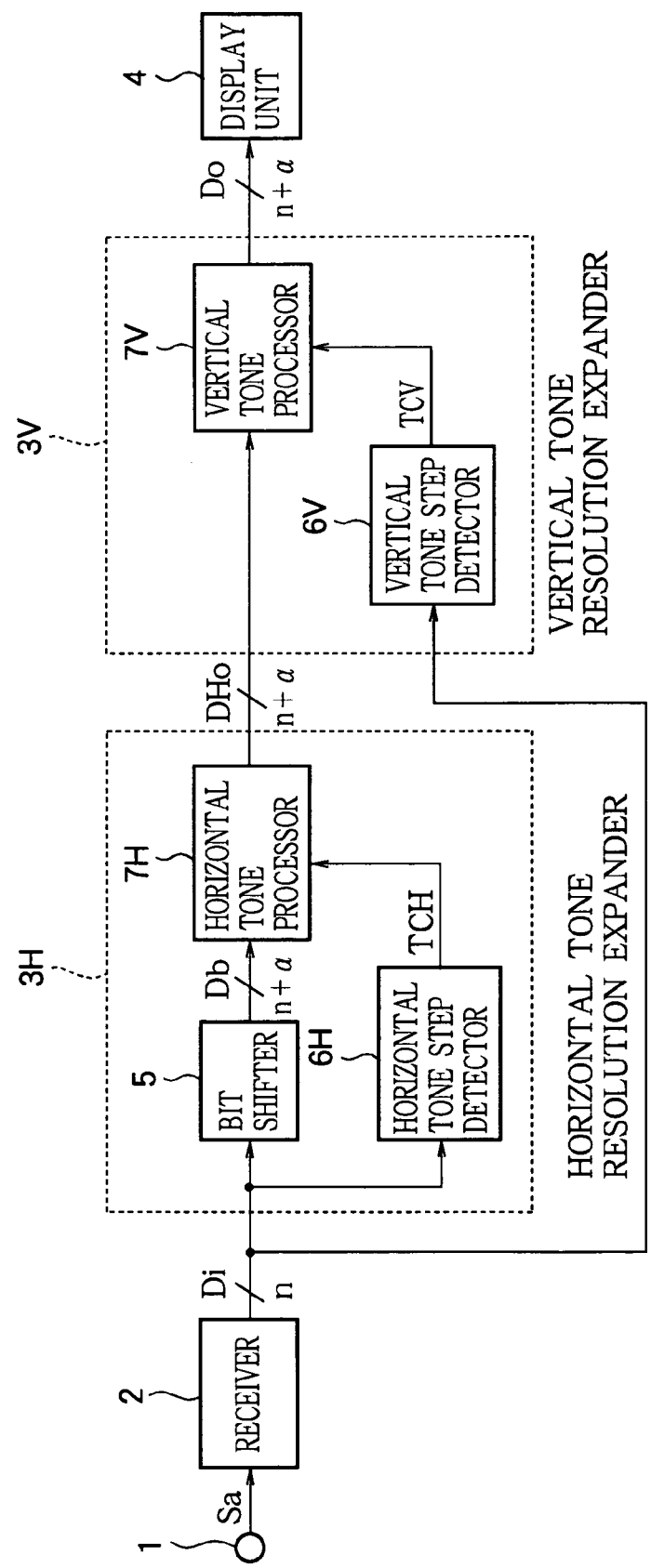
FIG. 9 is a drawing showing another example of image display apparatus according to Embodiment 1.

FIG. 9 shows an image display apparatus performing tone resolution expansion in both horizontal and vertical directions. An image display apparatus performing tone resolution expansion both in horizontal and vertical directions comprises an input terminal 1, a receiver 2, a horizontal tone resolution expander 3H, a vertical tone resolution expander 3V, and a display unit 4. An analog image signal Sa is input via the input terminal 1 to the receiver 2, which converts the analog image signal Sa into an n-bit image data Di, and supplies the n-bit image data Di to the horizontal tone resolution expander 3H and the vertical tone resolution expander 3V. The horizontal tone resolution expander 3H comprises a bit shifter 5, a horizontal tone step detector 6H, and a horizontal tone processor 7H, converts the input n-bit image data Di to (n+α)-bit image data DHo, and supplies the smoothed (n+α)-bit image data DHo to the vertical tone resolution expander 3V. The vertical tone resolution expander 3V comprises a vertical tone step detector 6V, and a vertical tone processor 7V, and detects tone steps in the n-bit image data Di, and smoothes the (n+α)-bit image data DHo, and outputs smoothed (n+α)-bit image data Do to the display unit 4. Since the horizontal tone resolution expander 3H applies the leftward bit-shifting, the vertical tone resolution expander 3V does not have the function of bit-shifting. The display unit 4 displays images based on the (n+α)-bit image data Do.

The operation of the image display apparatus performing tone resolution expansion in both the horizontal and vertical directions will now be described with reference to FIG. 9.

The analog image signal Sa is input via the input terminal 1 to the receiver 2. The receiver 2 converts the image signal Sa to n-bit image data Di, and supplies the n-bit image data Di to the bit shifter 5, the horizontal tone step detector 6H, and the vertical tone step detector 6V.

The bit shifter 5 bit-shifts the image data Di to the left by α bits, and outputs the (n+α)-bit image data Db to the horizontal tone processor 7H.

The horizontal tone step detector 6H examines or detects whether a tone step is contained in the horizontally arranged pixels in the image data Di, and outputs a horizontal tone processing control signal TCH indicating whether a tone step is contained in the detected region. The horizontal tone processing control signal TCH is supplied to the horizontal tone processor 7H.

The construction and the operation of the horizontal tone step detector 6H are similar to those of the tone step detector 6 shown in FIG. 1 and described with reference to FIG. 3, FIGS. 4A to 4D.

The horizontal tone processor 7H outputs the (n+α)-bit image data DHo which has been smoothed only in the region where the horizontal tone processing control signal TCH for the image data Db indicates that a tone step is contained. The output (n+α)-bit image data DHo is supplied to the vertical tone processor 7V.

The vertical tone step detector 6V examines or detects whether a tone step is contained in the vertically arranged pixels in the image data Di, and outputs a vertical tone processing control signal TCV indicating whether a tone step is contained in the detected region. The vertical tone processing control signal TCV is supplied to the vertical tone processor 7V.

The construction and the operation of the vertical tone step detector 6V are similar to those of the tone step detector 6 shown in FIG. 1 and described with reference to FIG. 3, FIGS. 4A to 4D. However, the image data Di is for the vertically arranged pixels, so that the terms "left and right sides" in connection with the regions Ra and Rc should be replaced with "upward and downward sides." Alternatively, the terms "left and right sides" should be construed on the construed on the assumption that the image data is arranged from left to right in the sequence in which they are supplied. To avoid any misinterpretation, the term "front" may be used to cover both the "left" and "upward," and the term "rear" may be used cover both "right" and "downward."

The vertical tone processor 7V outputs (n+α)-bit image data Do which has been smoothed only in such a region where the vertical tone processing control signal TCV indicates a tone step is contained. The output (n+α)-bit image data Do is supplied to the display unit 4.

Instead of conducting the horizontal tone resolution expansion first, followed by the vertical tone resolution expansion, it is also possible to conduct the vertical tone resolution expansion first, followed by the horizontal tone resolution expansion.

By conducting the tone resolution expansion both in the horizontal and vertical directions (either in this or reverse order), it is possible to increase the number of tones of the image data without losing the sharpness of the image possessed in the area where the tone variation is abrupt, e.g., a contour, or where the dynamic range is locally high, so that it is possible to reduce the degradation of the image quality due to the quantization both in the horizontal and vertical directions.

Figure 10:
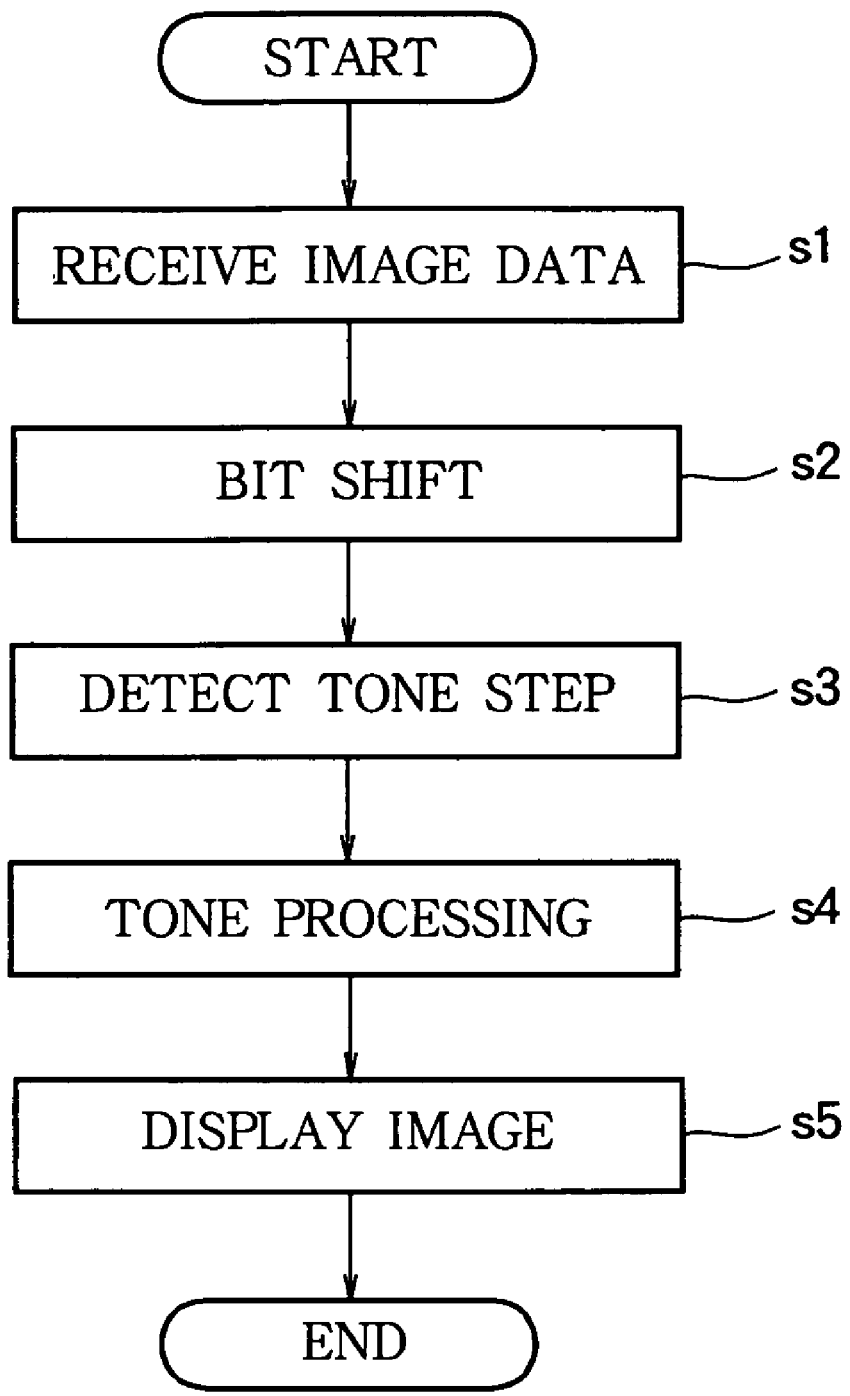
FIG. 10 is a flowchart showing the processing steps of the image processing apparatus shown in FIG. 1.

FIG. 10 is a flowchart showing the processing steps of the image display apparatus according to the embodiment of FIG. 1.

First, an image signal Sa is input to the input terminal 1, and the receiver 2 receives the image signal Sa, and outputs n-bit image data Di (s1). The image data Di output from the receiver 2 is input to the bit shifter 5 and the tone step detector 6 in the tone resolution expander 3. The bit shifter 5 bit-shifts the image data Di to the left by a bits, and outputs (n+α)-bit image data Db (s2). The tone step detector 6 detects a tone step in the image data Di, and outputs a tone processing control signal TC indicating whether a tone step is contained (s3). The tone processor 7 receives the image data Db from the bit shifter 5, and the tone processing control signal TC from the tone step detector 6, and smoothes the image data Db only in the region where the tone processing control signal TC indicates that a tone step is contained, and outputs image data Do obtained as a result of such a processing (s4). The image data Do output from the tone processor 7 is input to the display unit 4, which displays the image based on the image data Do (s5).

Embodiment 2

Figure 11:
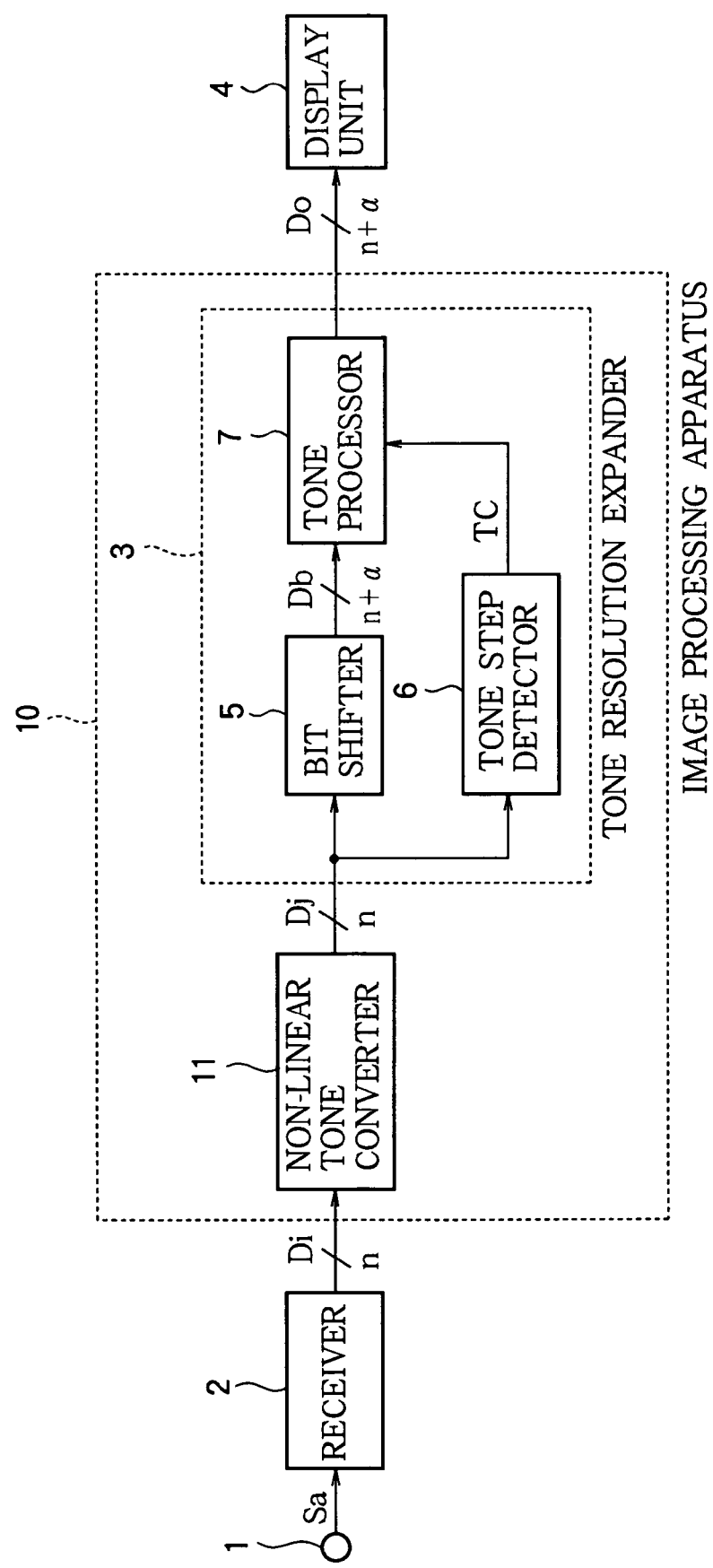
FIG. 11 is a drawing showing the configuration of an image display apparatus according to Embodiment 2.

FIG. 11 shows an image display apparatus according to Embodiment 2 of the present invention. The image display apparatus according to Embodiment 2 comprises an image processing apparatus comprising an input terminal 1, a receiver 2, and an image processor 10, and a display unit 4. An analog image signal Sa is input via the input terminal 1 to the receiver 2, which converts the analog image signal Sa to n-bit image data Di, and outputs the n-bit image data Di to the image processor 10. The image processor 10 comprises a non-linear tone converter 11, and a tone resolution expander 3, and applies image processing such as non-linear tone conversion and tone resolution expansion to the input n-bit image data Di, and outputs (n+α)-bit image data Do to the display unit 4. The non-linear tone converter 11 applies non-linear tone conversion to the input image data Di, and outputs n-bit image data Dj to the tone resolution expander 3. The tone resolution expander 3 comprises a bit shifter 5, a tone step detector 6, and a tone processor 7, and converts the n-bit image data Dj to the (n+α)-bit image data Do, and output the (n+α)-bit image data Do to the display unit 4. The display unit 4 display images based on the (n+α)-bit image data Do.

The operation of the image display apparatus of Embodiment 2 is similar to that of the image display apparatus of Embodiment 1. The description previously made in connection with Embodiment 1 is applicable to Embodiment 2 as long as it does not contradict the description given below.

Figure 12A:
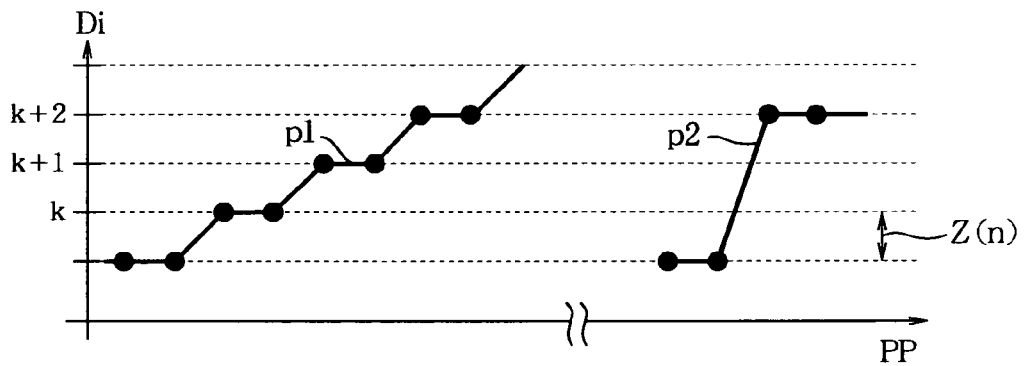
FIGS. 12A to 12D are drawings for explaining the operation of the image display apparatus according to Embodiment 2.
Figure 12B:
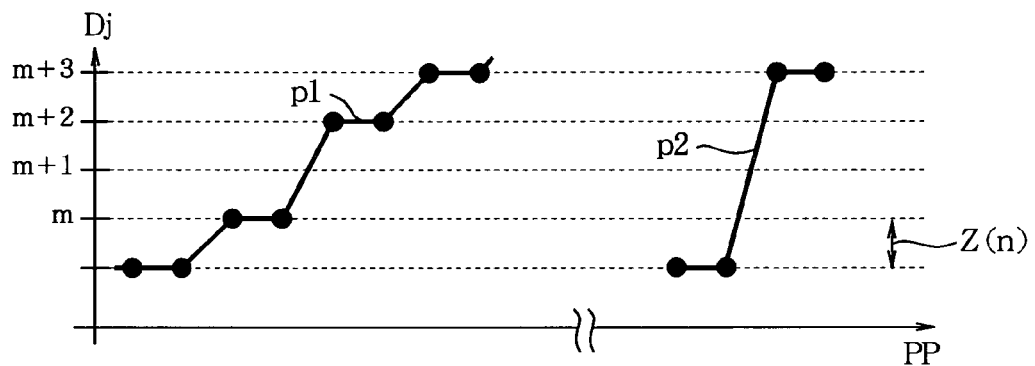
Figure 12C:
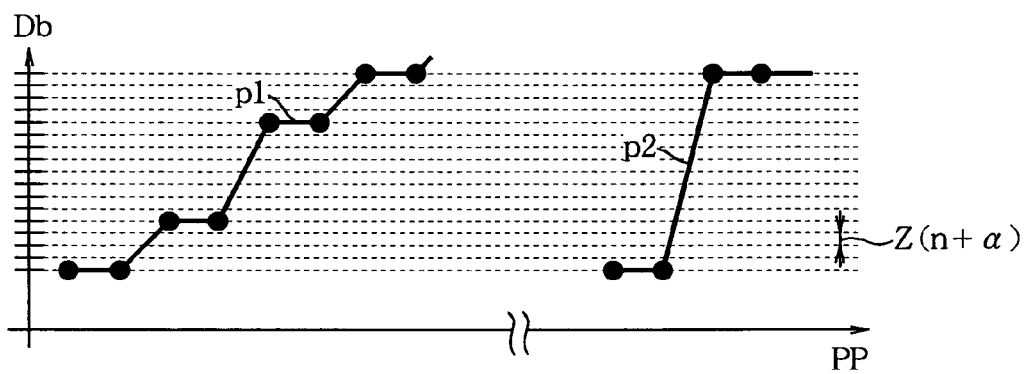
Figure 12D:
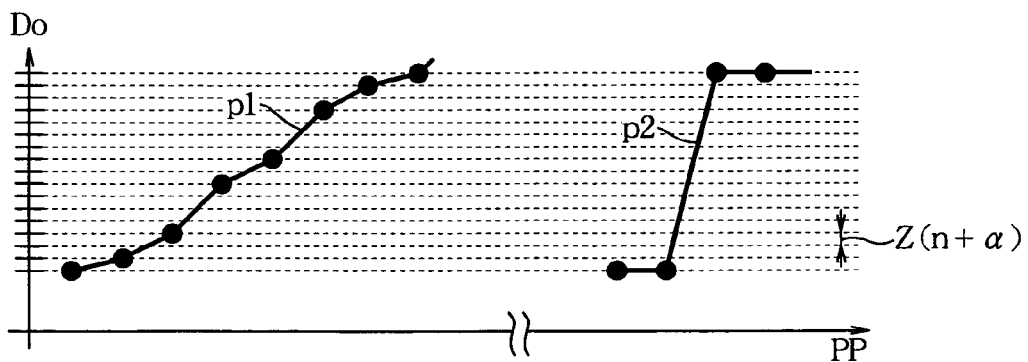

FIGS. 12A to 12D is used to describe the operation of the image display apparatus according to the Embodiment 2. FIG. 12A shows the n-bit image data Di output from the receiver 2, FIG. 12B shows the image data Dj output from the non-linear tone converter 11, corresponding to the image data Di shown in FIG. 12A, FIG. 12C shows (n+α)-bit image data Db obtained by bit-shifting the image data Dj shown in FIG. 12B to the left by α bits. FIG. 12D shows image data Do output from the tone processor 7, corresponding to the image data Db shown in FIG. 12C. The horizontal axes represent the pixel position PP, while the vertical axes represent tone of the respective image data.

The operation of the image display apparatus according to Embodiment 2 will next be described with reference to FIG. 11 and FIGS. 12A to 12D.

The receiver 2 converts the analog image signal Sa to the n-bit image data Di shown in FIG. 12A, and outputs the n-bit image data Di to the non-linear tone converter 11.

Figure 13:
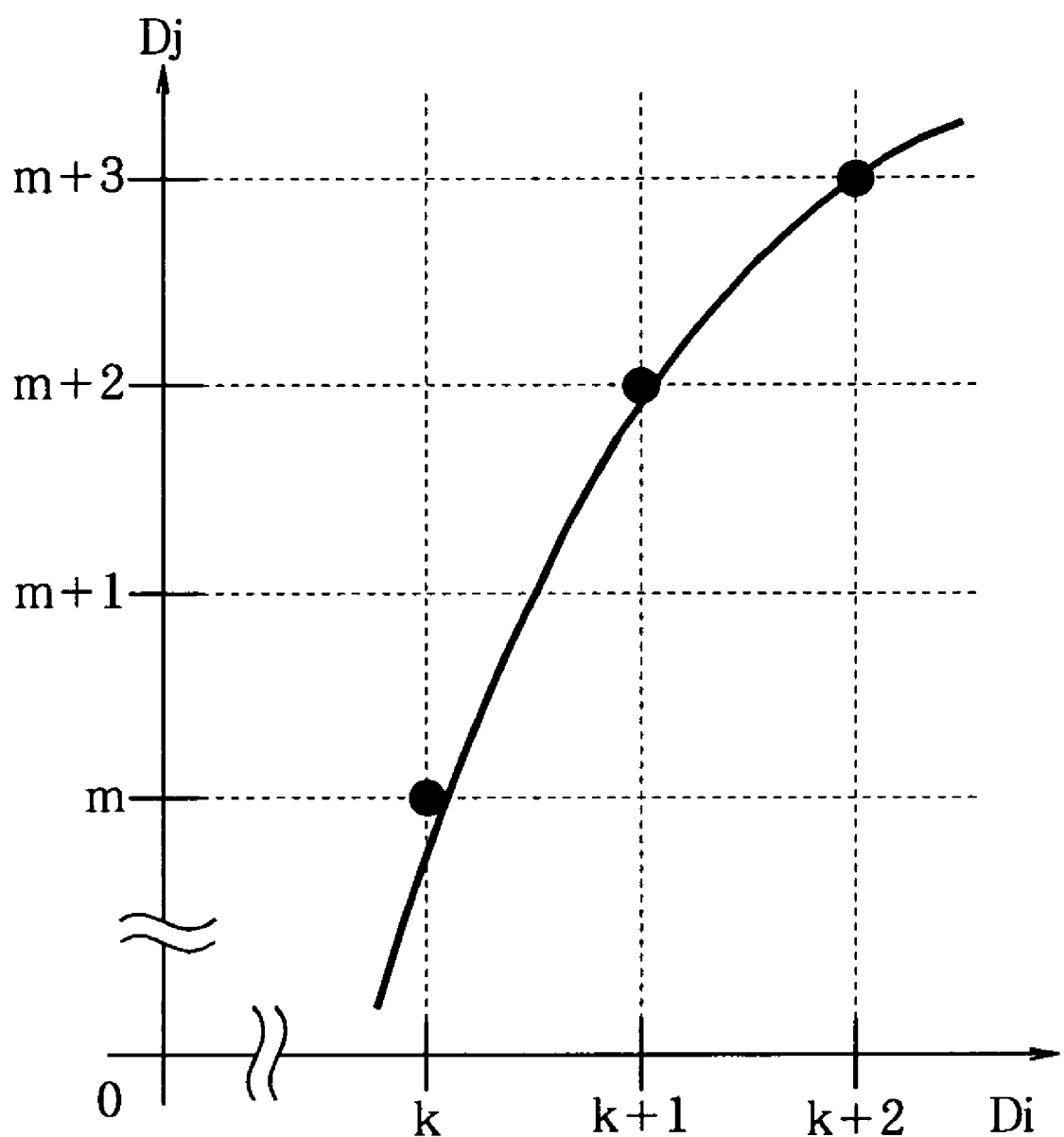
FIG. 13 is a drawing for explaining the operation of a non-linear tone converter according to Embodiment 2.

FIG. 13 shows an example of the input-output relationship of the non-linear tone converter 11. The horizontal axis represents the tone of the input image data Di of the non-linear tone converter 11, while the vertical axis represents the tone of the output image data Dj.

The non-linear tone converter 11 converts the image data Di to the image data Dj shown in FIG. 12B, according to the input-output relationship shown in the graph of FIG. 13, and outputs the image data Dj to the tone resolution expander 3. In the example shown by the graph of FIG. 13, the non-linear tone converter 11 converts the tone k of the image data Di to tone m; tone k+1 to tone m+2; tone k+2 to tone m+3, and outputs the result of the tone conversion as the image data Dj, to the tone resolution expander 3.

In the region p1 of the image data Di shown in FIG. 12A, the tone varies gradually by "0" or by "1" (between adjacent pixel). But as the non-linear tone converter 11 converts the tone k+1 of the image data Di to tone m+2, tone m+1 does not appear in the image data Dj shown in FIG. 12B, and the tone varies (jumps) from a value m to a value m+2, i.e., by a difference of "2."

In the example shown in FIG. 12B, the tone of the image data Dj produced as a result of the non-linear tone conversion jumps by "2" in a region where the tone varies gradually. If the image data Dj output by the non-linear tone converter 11 skips two tone values, the tone of the image data Dj jumps by three tone values.

In the present embodiment, a part at which the tone varies (jumps) by Ds, within a region having a certain width, such as a region p1 shown in FIG. 12B, i.e., a region consisting of a certain number of consecutive pixels where the tone varies gradually is called a tone step. (Ds is a positive integer not smaller than 2, and not larger than Dsmax, with Dsmax being another positive integer.)

In Embodiment 1, a part where the tone varies stepwise by "1" within a region having a certain width, i.e., a region consisting of a certain number of consecutive pixels is defined as a tone step. The tone step according to the definition of Embodiment 1 may be regarded as one type of a tone step according to Embodiment 2, with Ds being set to "1."

The tone step, like the tone step defined in Embodiment 1, occurs where the variation in tone against the number of pixels is small, i.e., the variation increases monotonically or decreases monotonically with a gradient satisfying a condition Y/X<1, with X being a predetermined number, and Y being the variation in the tone after the quantization over X pixels.

The region p2 of the image data Di shown in FIG. 12A includes an abrupt variation in the tone, and in the image data Dj shown in FIG. 12B, Y/X≧1, so that no tone step is found to occur.

The bit shifter 5 bit-shifts the image data Dj shown in FIG. 12B to the left by α bits, and outputs the (n+α)-bit image data Db shown in FIG. 12C.

The tone step detector 6 detects where a tone step is present in the image data Dj shown in FIG. 12B. If the image data Dj shown in FIG. 12B is examined, a tone step is detected in the region p1, while no tone step is detected in the region p2. The tone processing control signal TC output from the tone step detector 6 assumes a value indicating that a tone step is contained in a region where the tone step has been detected, i.e., the region p1 of the image data Db shown in FIG. 12C, to the tone processor 7.

The tone processor 7 smoothes the image data Db for the region where the tone processing control signal TC indicates that a tone step is included, and outputs the image Db as is, i.e., without smoothing, for other regions. As a result, the image data Do shown in FIG. 12D having been smoothed only for the region p1 of the image data Db shown in FIG. 12C is output.

The tone processor 7 uses a low-pass filter (LPF) for the smoothing. In the description of the present embodiment, as in Embodiment 1, a one-dimensional average value filter (the equation (1)) is assumed to be used. But other LPFs may be used for the smoothing, and yet similar effects can be obtained.

By detecting the region where the tone of the image data after the non-linear tone conversion varies gradually, and smoothing the detected region (the region having been found to contain a tone step), the number of tones of the image data can be increased without losing the sharpness of the image possessed by the region, such as a contour, where the tone varies abruptly, or the region where the dynamic range is locally high, so that the degradation in the image quality due to the non-linear conversion can be reduced.

Next, the tone step detector 6 detecting the tone step using the first derivative, suitable for Embodiment 2, will be described.

Figure 14B:
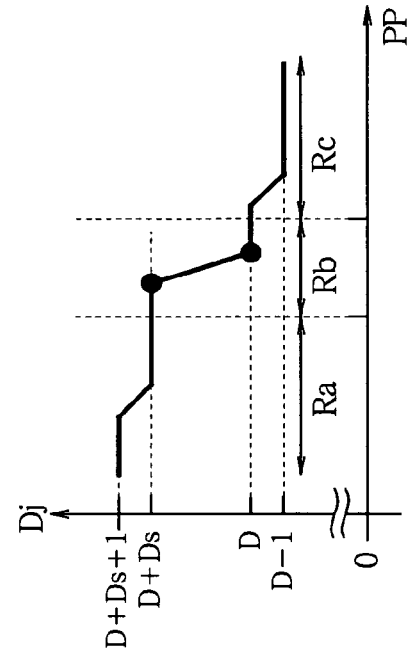
FIGS. 14A to 14D are drawings for explaining the operation of a tone step detector according to Embodiment 2.
Figure 14D:
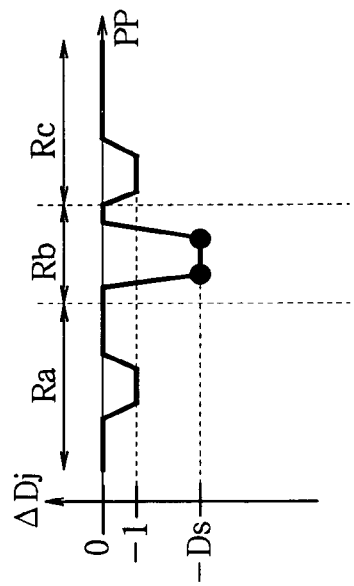
Figure 14A:
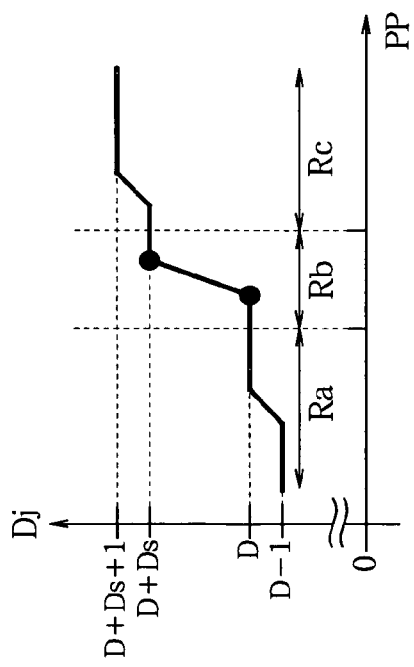
Figure 14C:
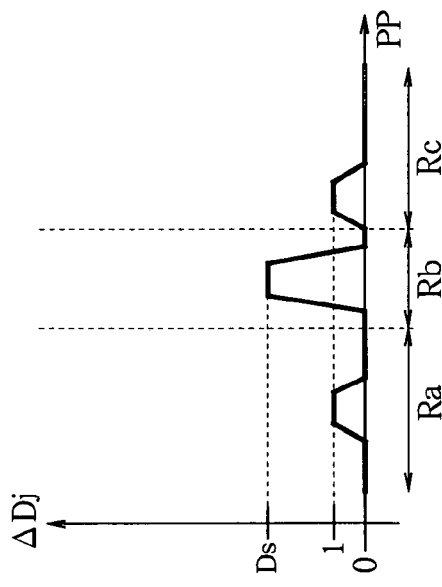

FIGS. 14A to 14D illustrate a method for detecting the tone step using the first derivative data. FIGS. 14A and 14B show the image data Dj in the region containing a tone step, while FIGS. 14C and 14D show the first derivative data ΔDj corresponding to the image data Dj shown in FIGS. 14A and 14B.

At a tone step, tone varies by Ds in the middle of the gradual variation of the tone as shown in FIGS. 14A and 14B, so that the step region can be divided into a region Rb where the tone varies by Ds, and the regions Ra and Rc which are positioned on the left and right sides of the region Rb, and in which the tone varies gradually.

The operation of the tone step detector 6 to detect tone steps using the first derivative data will be described in detail with reference to FIG. 3, and FIGS. 14A to 14D.

As was also described in connection with Embodiment 1, the first derivative calculator 8 calculates the first derivative of the image data Dj shown in FIG. 14A according to the equation (2), and outputs the first derivative data ΔDj shown in FIG. 14C. It also calculates the first derivative of the image data Dj shown in FIG. 14B according to the equation (2), and outputs the first derivative data ΔDj shown in FIG. 14D.

When the first derivative of the image data Dj whose tone varies by Ds in the middle of a gradual increase, as shown in FIG. 14A is calculated, the first derivative data ΔDj(i) becomes "0" or "1" in the regions Ra and Rc where the tone increases gradually, while the first derivative data ΔDj (i) for the region Rb becomes "Ds." When the first derivative of the image data Dj whose tone varies by "−Ds" in the middle of gradual decrease as shown in FIG. 14B is calculated, the first derivative data ΔDj(i) becomes "0" or "−1" in the regions Ra and Rc where the tone decreases gradually, while the first derivative data ΔDj(i) for the region Rb becomes "−Ds."

As has been described, the judgment unit 9 judges that the region in question is a step region if there is a tone step where the first derivative data ΔDj(i) is both "Ds" for two consecutive pixels, and the first derivative data ΔDj(i) is "0" or "1 " on both sides of the tone step, or if there is a tone step where the first derivative data ΔDj(i) is both "−Ds" for two consecutive pixels, and the first derivative data ΔDj(i) is "0" or "−1" on both sides of the tone step. Upon detection of a tone step, the judgment unit 9 outputs a tone processing control signal TC indicating that a tone step is contained in the region for which the judgment has been made.

The operation of the tone resolution expander 3 will next be described with reference to examples.

Figure 15:
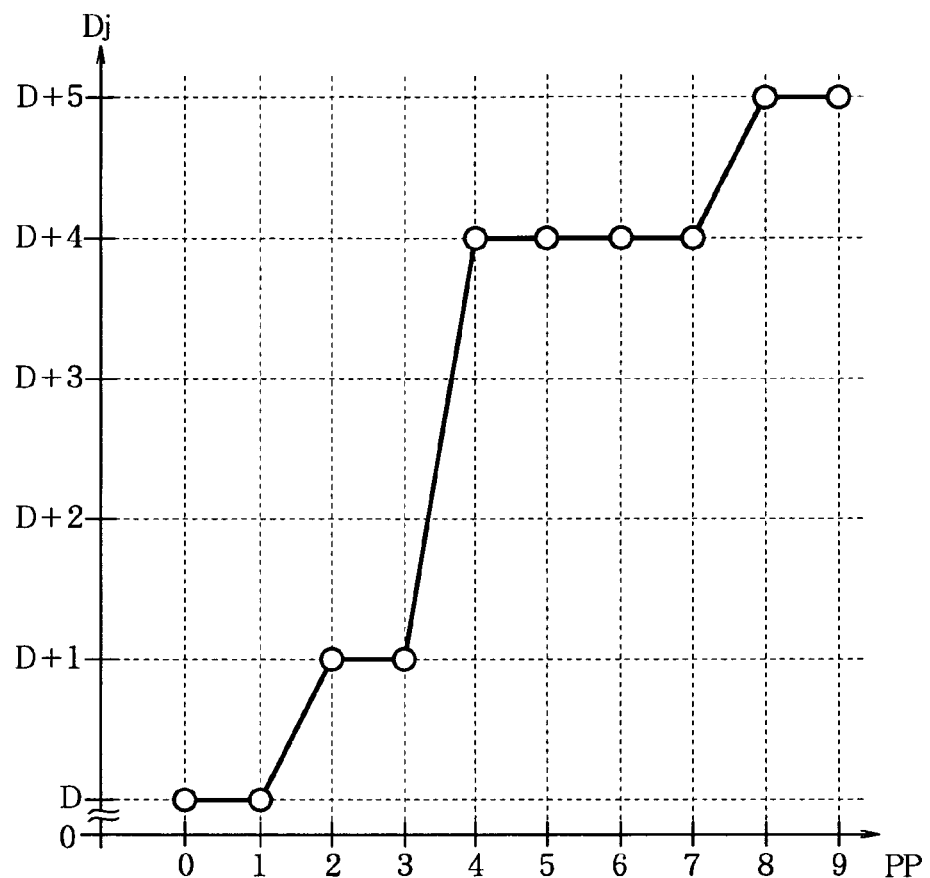
FIG. 15 is a drawing showing an example of tone resolution expansion according to Embodiment 2, and shows image data Dj output by a non-linear tone converter 11.
Figure 16:
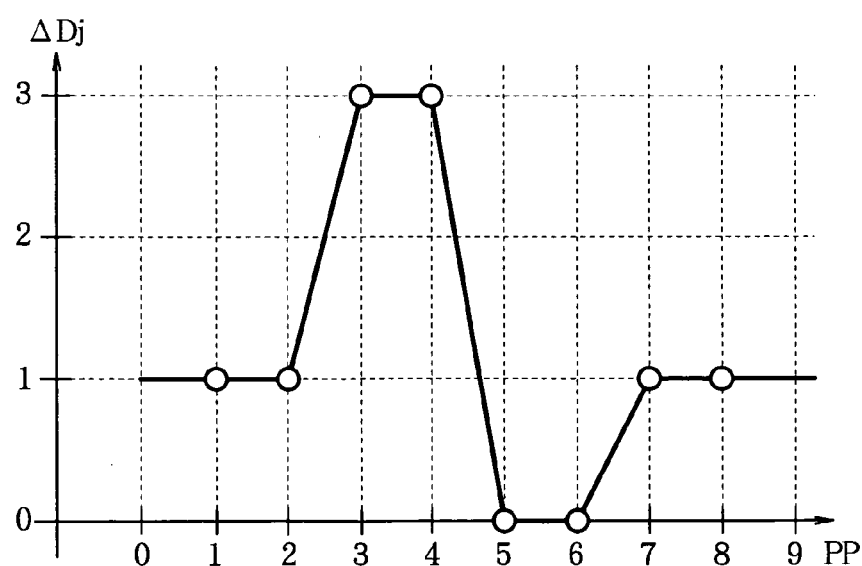
FIG. 16 is a drawing showing first derivative data $\Delta Di$ of the image data Dj shown in FIG. 15, calculated by a first derivative calculator 8, in an example of the tone resolution expansion according to Embodiment 2.
Figure 17:
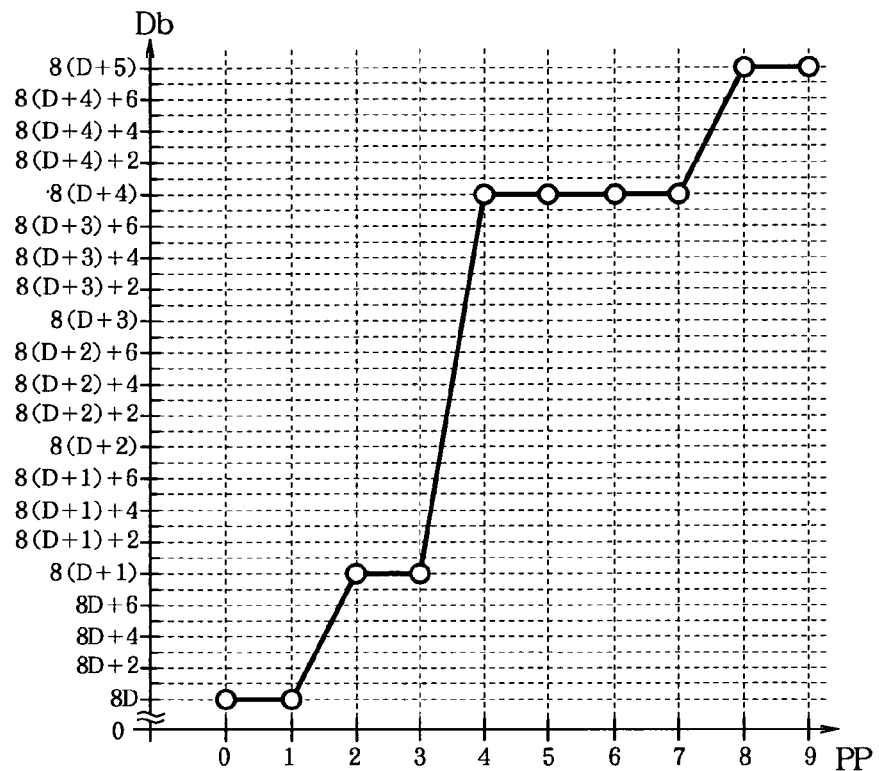
FIG. 17 is a drawing showing $(n+3)$-bit image data Db obtained by bit-shifting the image data Dj shown in FIG. 15, to the left by three bits, by means of a bit shifter 5, in an example of the tone resolution expansion according to Embodiment 2.
Figure 18:
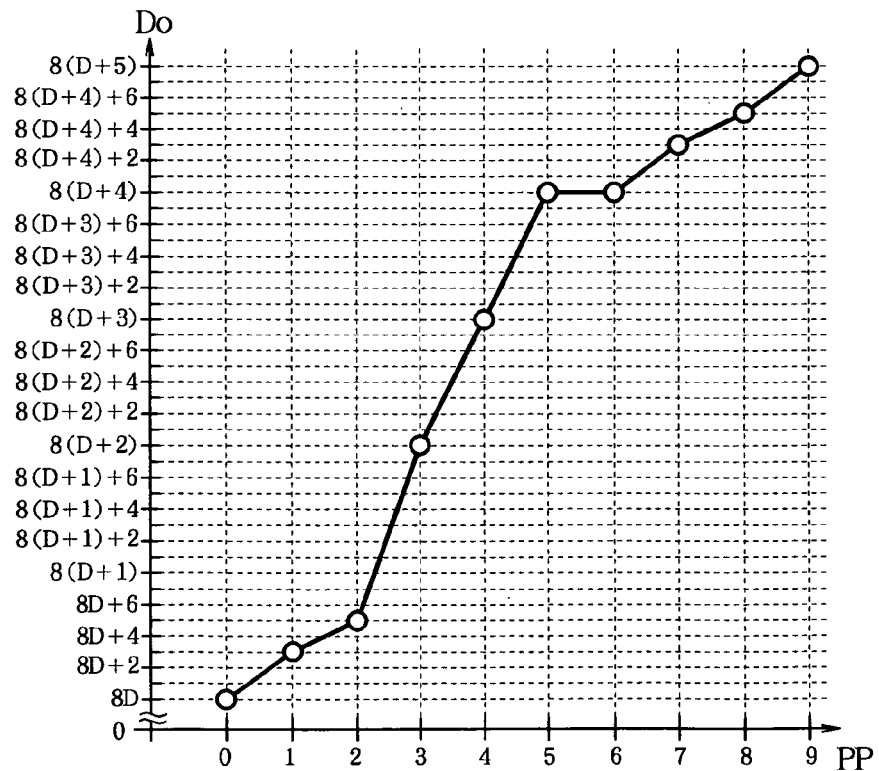
FIG. 18 is a drawing showing $(n+3)$-bit image data Do output by a tone processor 7, corresponding to the image data Db shown in FIG. 17, in an example of the tone resolution expansion according to Embodiment 2.

FIG. 15 to FIG. 18 illustrate an example of tone resolution expansion on image data containing a tone step. FIG. 15 shows the image data Dj output from the non-linear tone converter 11, FIG. 16 shows the first derivative data ΔDj of the image data Dj shown in FIG. 15, calculated by the first derivative calculator 8, FIG. 17 shows the (n+3)-bit image data Db obtained by bit-shifting the image data Dj shown in FIG. 15, to the left by three bits by the bit shifter 5. FIG. 18 shows the (n+3)-bit image data Do output by the tone processor 7, corresponding to the image data Db shown in FIG. 17.

An example will next be described with reference to FIG. 11, FIG. 3, and FIG. 15 to FIG. 18. In the example, it is assumed that α=3, and the tone resolution expander 3 converts the n-bit image data Dj to the (n+3)-bit image data Do. It is also assumed that Dsmax=3, and the smoothing is applied to a tone step which is not smaller than 2 and not larger 3.

The pixel position PP of the image data Dj shown in FIG. 15 is identified as 0 to 9, and the tone at each pixel position is assumed to be: Dj(0)=D, Dj(1)=D, Dj(2)=D+1, Dj(3)=D+1, Dj(4)=D+4, Dj(5)=D+4, Dj(6)=D+4, Dj(7)=D+4, Dj(8)=D+5, Dj(9)=D+5.

The image data Dj is input to the bit shifter 5 and the tone step detector 6. The bit shifter 5 bit-shifts the image data Dj shown in FIG. 15 to the left by three bits, and outputs the image data Db shown in FIG. 17 to the tone processor 7. The tone at the pixel position 0 to 9 is given by: Db(0)=8D, Db(1)=8D, Db(2)=8(D+1), Db(3)=8(D+1), Db(4)=8(D+4), Db(5)=8(D+4), Db(6)=8(D+4), Db(7)=8(D+4), Db(8)=8(D+5), Db(9)=8(D+5).

In the tone step detector 6, the image data Dj is input to the first derivative calculator 8, which calculates first derivative of the image data Dj shown in FIG. 15 in accordance with the equation (2), and outputs first derivative data $\Delta Dj$ shown in FIG. 16 to the judgment unit 9. The first derivative data $\Delta Dj(i)$ at the pixel positions 1 to 8 is given by:

$\Delta Dj(1)=Dj(2)-Dj(0)=(D+1)-D=1$, $\Delta Dj(2)=Dj(3)-Dj(1)=(D+1)-D=1$, $\Delta Dj(3)=Dj(4)-Dj(2)=(D+4)-(D+1)=3$, $\Delta Dj(4)=Dj(5)-Dj(3)=(D+4)-(D+1)=3$, $\Delta Dj(5)=Dj(6)-Dj(4)=(D+4)-(D+4)=0$, $\Delta Dj(6)=Dj(7)-Dj(5)=(D+4)-(D+4)=0$, $\Delta Dj(7)=Dj(8)-Dj(6)=(D+5)-(D+4)=1$, $\Delta Dj(8)=Dj(9)-Dj(7)=(D+5)-(D+4)=1$.

The judgment unit 9 judges that the pixel positions 1 to 8 in FIG. 15 constitute a step region from the fact that: $\Delta Dj(1)=1$, $\Delta Dj(2)=1$, $\Delta Dj(3)=3$, $\Delta Dj(4)=3$, $\Delta Dj(5)=0$, $\Delta Dj(6)=0$, $\Delta Dj(7)=1$, $\Delta Dj(8)=1$, so that the pixels at pixel positions 3 and 4 are at a tone step because $\Delta Dj(i)=Ds(2 \leq Ds \leq Dsmax=3)$ for the pixel positions 3 and 4, and the pixels at the pixel positions 1, 2, 5, 6, 7, 8 form a region where $\Delta Dj(i)=0$ or 1, and outputs a tone processing control signal TC indicating that a tone step is contained in the image data Db shown in FIG. 17, to the tone processor 7.

As the tone processing control signal TC indicates that a tone step is contained in the image data Dj shown in FIG. 15, the tone processor 7 smoothes the image data Db shown in FIG. 17, to output the image data Do shown in FIG. 18. The image data Do(i) at the pixel positions 1 to 8 is produced by an averaging filtering operation represented by the following equation obtained by applying K=3 in the equation (1):

$$Do(i) = (Db(i-1) + Db(i) + Db(i+1))/3$$

For i = 1, 2, 3, 4, 5, 6, 7, 8, $$Do(1) = (Db(0) + Db(1) + Db(2))/3$$
$$= (8D + 8D + 8(D+1))/3$$
$$= 8D + 3,$$

$$Do(2) = (Db(1) + Db(2) + Db(3))/3$$
$$= (8D + 8(D+1) + 8(D+1))/3$$
$$= 8D + 5,$$

$$Do(3) = (Db(2) + Db(3) + Db(4))/3$$
$$= (8(D+1) + 8(D+1) + 8(D+4))/3$$
$$= 8(D+2),$$

$$Do(4) = (Db(3) + Db(4) + Db(5))/3$$
$$= (8(D+1) + 8(D+4) + 8(D+4))/3$$
$$= 8(D+3),$$

$$Do(5) = (Db(4) + Db(5) + Db(6))/3$$
$$= (8(D+4) + 8(D+4) + 8(D+4))/3$$
$$= 8(D+4),$$

$$Do(6) = (Db(5) + Db(6) + Db(7))/3$$
$$= (8(D+4) + 8(D+4) + 8(D+4))/3$$
$$= 8(D+4),$$

$$Do(7) = (Db(6) + Db(7) + Db(8))/3$$
$$= (8(D+4) + 8(D+4) + 8(D+5))/3$$
$$= 8(D+4) + 3,$$

$$Do(8) = (Db(7) + Db(8) + Db(9))/3$$
$$= (8(D+4) + 8(D+5) + 8(D+5))/3$$
$$= 8(D+4) + 5$$

Figure 19:
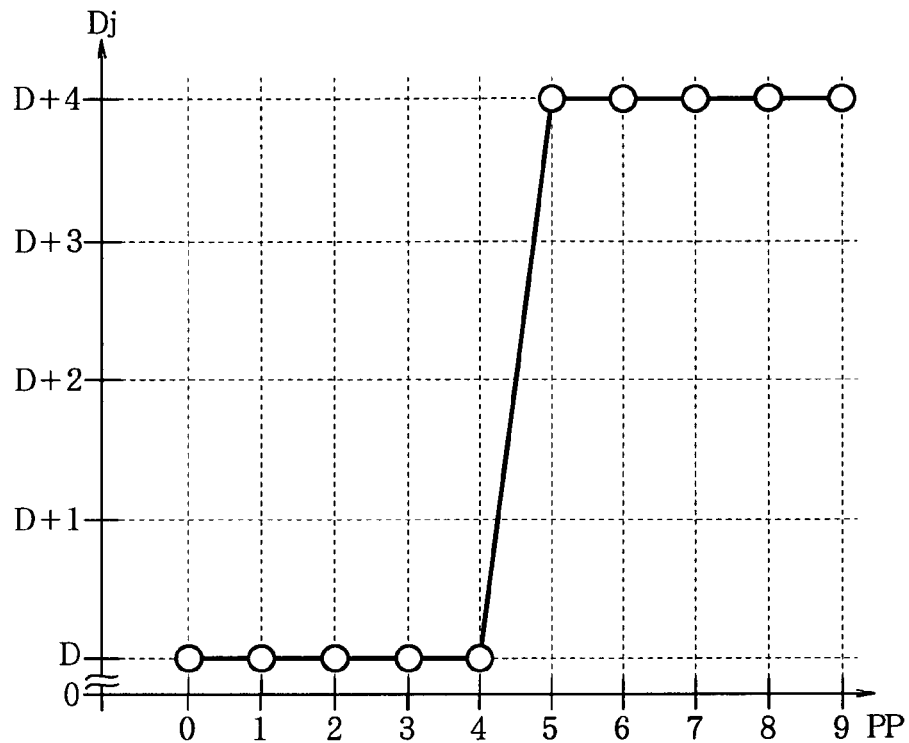
FIG. 19 is a drawing showing an example of the tone resolution expansion according to Embodiment 2, and shows image data Dj output by a non-linear tone converter 11.
Figure 20:
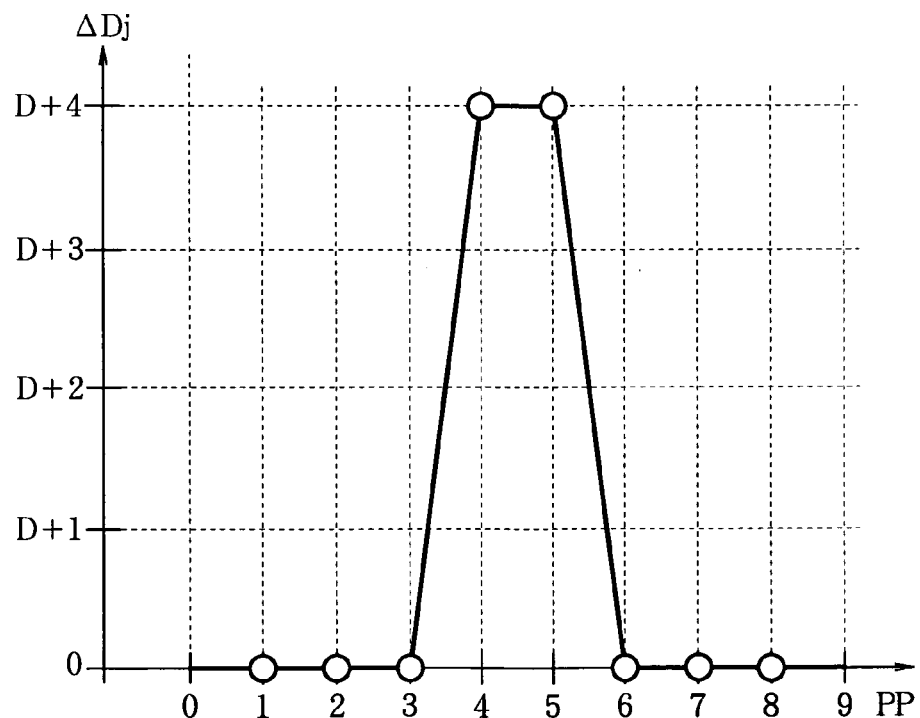
FIG. 20 is a drawing showing first derivative data $\Delta Di$ of the image data Dj shown in FIG. 19, calculated by a first derivative calculator 8, in an example of the tone resolution expansion according to Embodiment 2.
Figure 21:
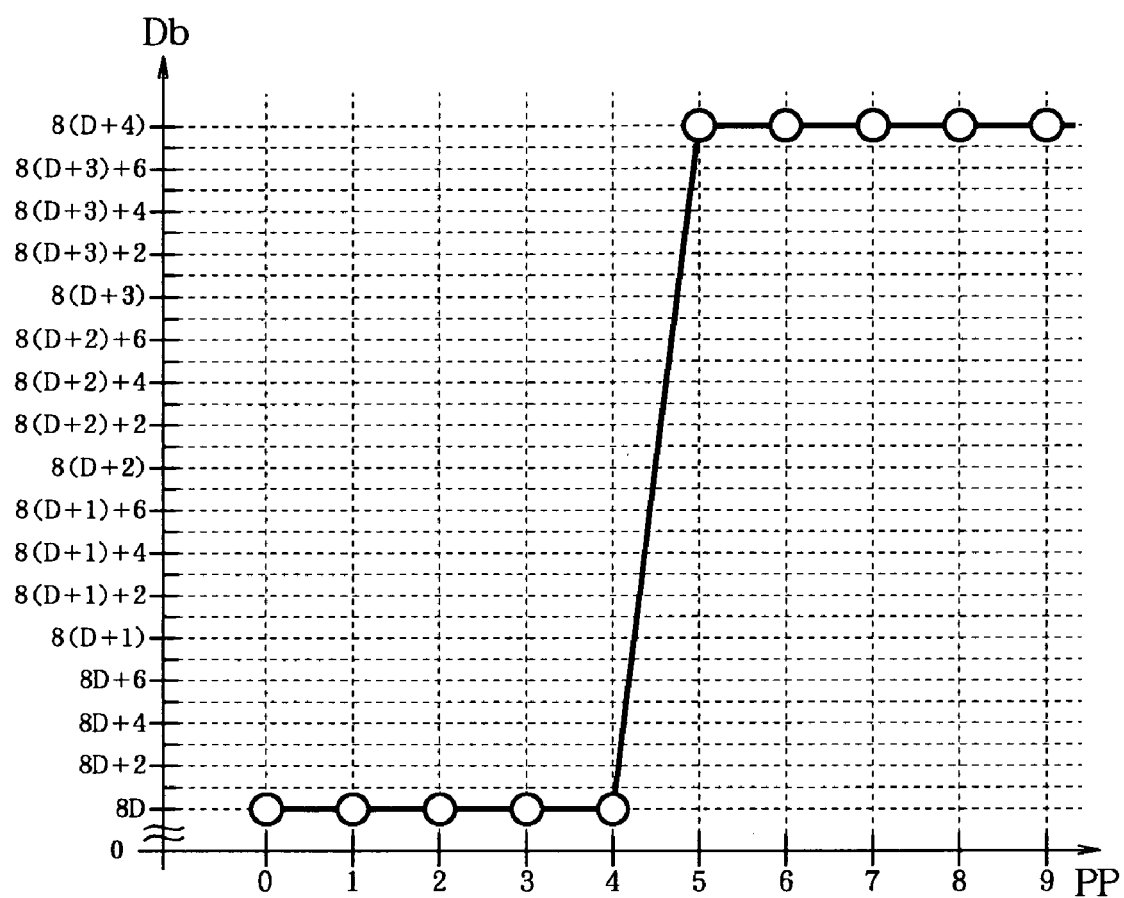
FIG. 21 is a drawing showing (n+3)-bit image data Db obtained by bit-shifting the image data Dj shown in FIG. 19, to the left by three bits, by means of the bit shifter 5, in an example of tone resolution expansion according to Embodiment 2.

FIG. 19 to FIG. 21 show an example of tone resolution expansion for image data which does not contain a tone step. FIG. 19 shows the image data Dj output from the non-linear tone converter 11, FIG. 20 shows the first derivative data $\Delta Dj$ of the image data Dj shown in FIG. 19, calculated by the first derivative calculator 8, FIG. 21 shows the (n+3)-bit image data Db obtained by bit-shifting the image data Dj shown in FIG. 19 to the left by three bits, by means of the bit shifter 5.

An example will be described with reference to FIG. 11, FIG. 3, and FIG. 19 to FIG. 21. It is assumed that the pixel positions PP of the image data Dj shown in FIG. 19 are identified by 0 to 9, and the tone at each pixel position is given by: Dj(0)=D, Dj(1)=D, Dj(2)=D, Dj(3)=D, Dj(4)=D, Dj(5)=D+4, Dj(6)=D+4, Dj(7)=D+4, Dj(8)=D+4, Dj(9)=D+4.

The image data Dj is input to the bit shifter 5 and the tone step detector 6, the bit shifter 5 bit-shifts the image data Dj shown in FIG. 19 to the left by three bits, to output the image data Db shown in FIG. 21 to the tone processor 7. The tone at the pixel positions 0 to 9 is given by: Db(0)=8D, Db(1)=8D, Db(2)=8D, Db(3)=8D, Db(4)=8D, Db(5)=8(D+4), Db(6)=8(D+4), Db(7)=8(D+4), Db(8)=8(D+4), Db(9)=8(D+4).

In the tone step detector 6, the image data Dj is input to the first derivative calculator 8, which uses the equation (2) to calculate the first derivative of the image data Dj shown in FIG. 19, to output first derivative data $\Delta Dj$ shown in FIG. 20, to the judgment unit 9. The first derivative data $\Delta Dj(i)$ at the pixel positions 1 to 8 is given by:

$\Delta Dj(1)=Dj(2)-Dj(0)=D-D=0$, $\Delta Dj(2)=Dj(3)-Dj(1)=D-D=0$, $\Delta Dj(3)=Dj(4)-Dj(2)=D-D=0$, $\Delta Dj(4)=Dj(5)-Dj(3)=(D+4)-(D+1)=4$, $\Delta Dj(5)=Dj(6)-Dj(4)=(D+4)-(D+1)=4$, $\Delta Dj(6)=Dj(7)-Dj(5)=(D+4)-(D+4)=0,$ $\Delta Dj(7)=Dj(8)-Dj(6)=(D+4)-(D+4)=0,$ $\Delta Dj(8)=Dj(9)-Dj(7)=(D+4)-(D+4)=0.$ The judgment unit 9 judges that no tone step is contained in the image data Dj shown in FIG. 19 from the fact that: ΔDj(1)=0, ΔDj(2)=0, ΔDj(3)=0, ΔDj(4)=4, ΔDj(5)=4, ΔDj(6)=0, ΔDj(7)=0, ΔDj(8)=0, so that the pixel positions 1 to 8 do not have to successive pixels for which ΔDj(i)=Ds (2≦Ds≦Dsmax=3), or −Ds.

As the tone processing control signal TC indicates that no tone step is contained in the image data Dj shown in FIG. 21, the tone processor 7 outputs the image data Db as the image data Do, as is, i.e., without smoothing.

As has been described, tone step detection can be achieved using the first derivative of the image data output from the non-linear tone converter 11.

Description has been made on the tone resolution expansion of the image data in the horizontal direction. Tone resolution expansion of the image data in the vertical direction can be made in a similar manner.

Like Embodiment 1, it is also possible to conduct tone resolution expansion both in the horizontal and vertical directions, by carrying out the tone resolution expansion in the horizontal direction, and tone resolution expansion in the vertical direction, one after another.

Figure 22:
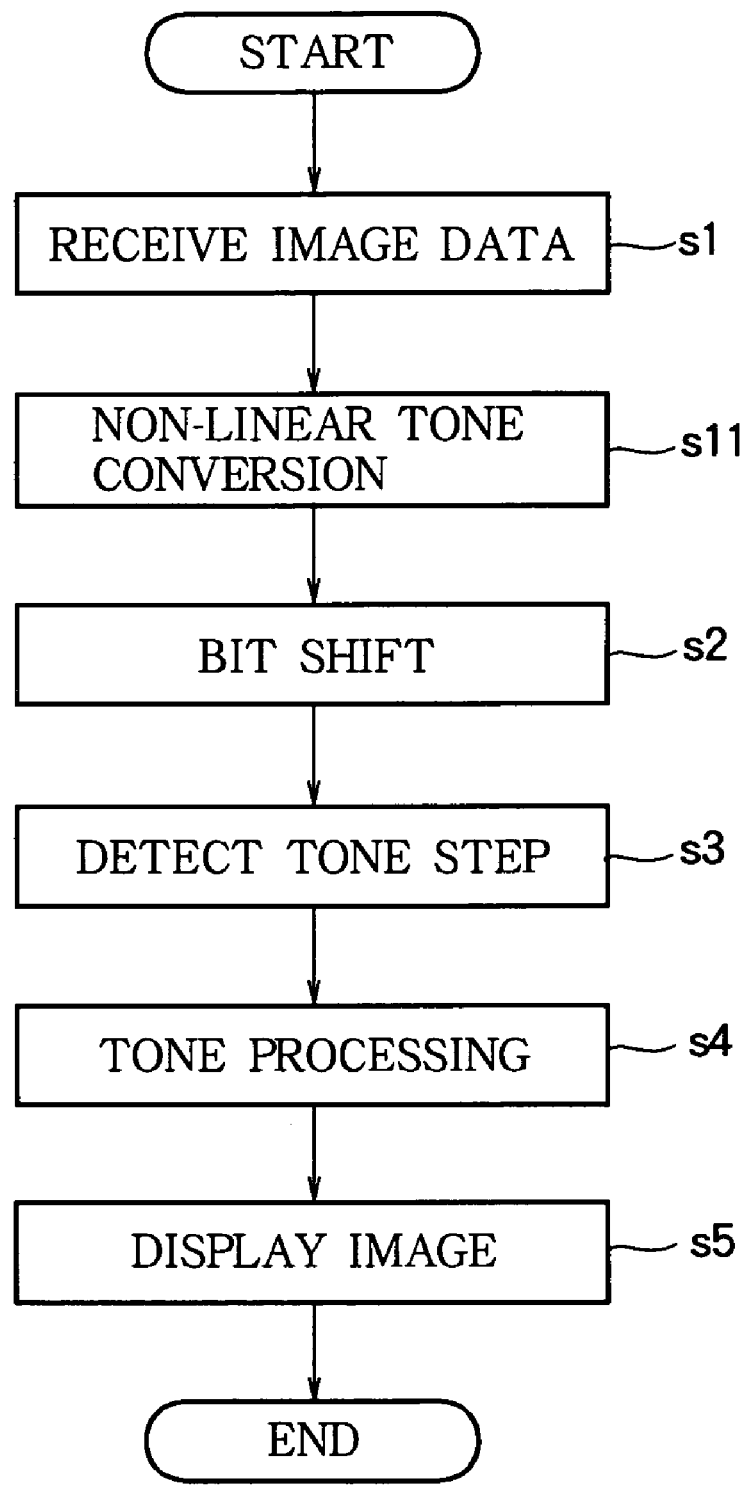
FIG. 22 is a flowchart showing the processing steps of the image processing apparatus according to Embodiment 2.

FIG. 22 is a flowchart showing the processing steps of the image processing apparatus according to the embodiment of FIG. 11.

First, the image signal Sa is input to the input terminal 1, and the receiver 2 receives the image signal Sa, and outputs the n-bit image data Di (s1). The image data Di output from the receiver 2 is input to the non-linear tone converter 11. The non-linear tone converter 11 applies non-linear tone conversion to the image data to output the image data Dj (s11). The image data Dj output from the non-linear tone converter 11 is input to the bit shifter 5 and the tone step detector 6 in the tone resolution expander 3. The bit shifter 5 bit-shifts the image data Dj to the left by a bits, and outputs the bit-shifted image data Db (s2). The tone step detector 6 detects a tone step in the image data Dj, and outputs a tone processing control signal TC indicating whether a tone step is contained (s3). The tone processor 7 receives the image data Db from the bit shifter, and smoothes the image data Db only in the region where the tone processing control signal TC indicates that a tone step is contained, and outputs the image data Do obtained as a result of such a processing (s4). The image data Do output from the tone processor 7 is input to the display unit 4, which displays the image based on the image data Do (s5).

Embodiment 3

Figure 23:
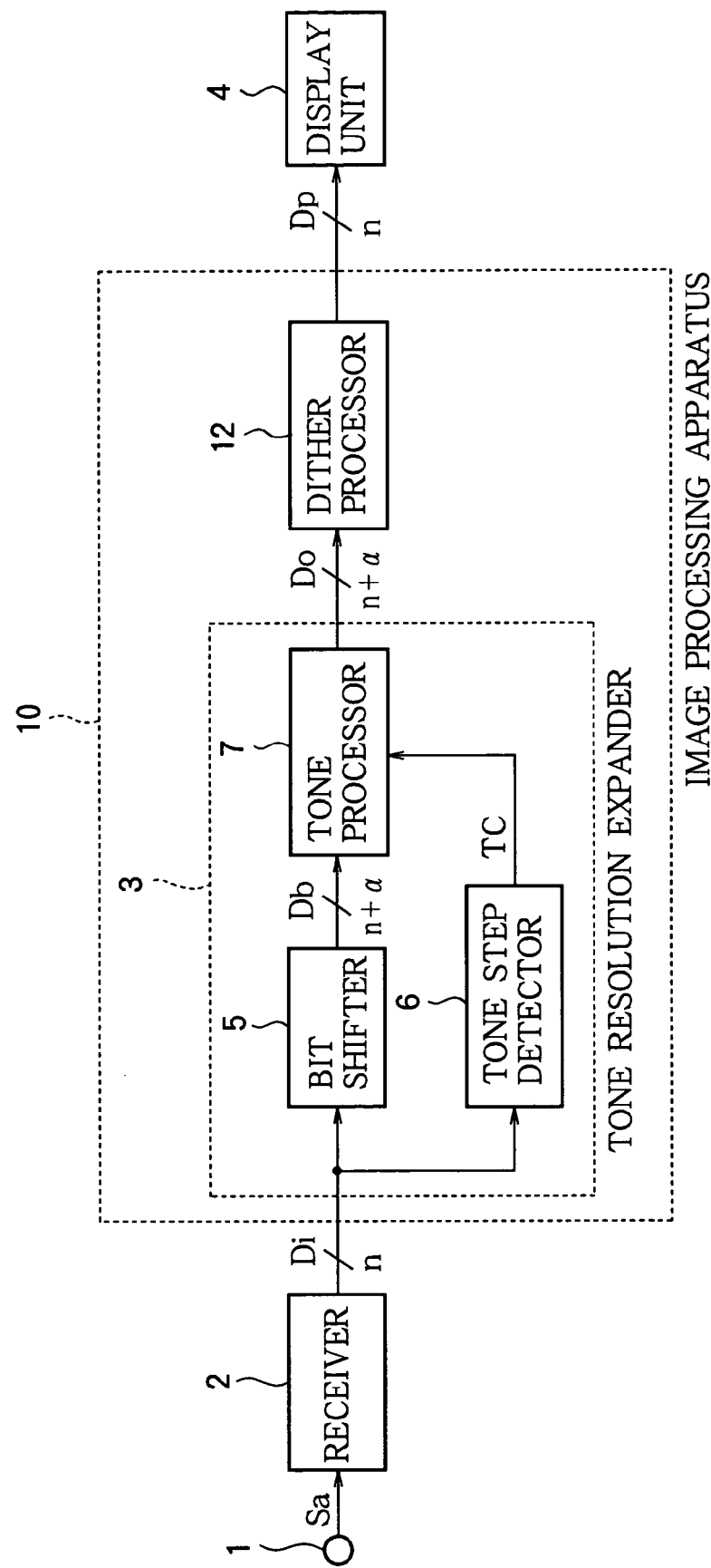
FIG. 23 is a drawing showing the configuration of an image display apparatus according to Embodiment 3.

FIG. 23 shows an image display apparatus according to Embodiment 3 of the present invention. The image display apparatus according to Embodiment 3 comprises an image processing apparatus comprising an input terminal 1, a receiver 2, and an image processor 10, and a display unit 4. An analog image signal Sa is input via the input terminal 1 to the receiver 2, which converts the analog image signal Sa to an n-bit image data Di, and outputs the n-bit image data Di to the image processor 10. The image processor 10 comprises a tone resolution expander 3 and a dither processor 12, and applies image processing such as tone resolution expansion and dither processing to the n-bit image data Di, and outputs n-bit image data Dp to the display unit 4. The tone resolution expander 3 comprises a bit shifter 5, a tone step detector 6 and a tone processor 7, and converts the n-bit image data Di to (n+α)-bit image data Do, and outputs the (n+α)-bit image data Do to the dither processor 12. The dither processor 12 converts the (n+α)-bit image data Do to the n-bit image data Dp, by means of dither processing, and outputs the n-bit image data Dp to the display unit 4. The display unit 4 displays an image based on the n-bit image data Dp.

The operation of the image display apparatus of Embodiment 3 is similar to that of the image display apparatus of Embodiment 1. The description previously made in connection with Embodiment 1 is applicable to Embodiment 3 as long as it does not contradict the description given below.

As was described in connection with Embodiment 1, the tone resolution expander 3 detects a tone step contained in the n-bit image data Di output from the receiver 2, and smoothes the image data in the region having been found to contain a tone step, and outputs the (n+α)-bit image data Do having been smoothed in the region having been found to contain a tone step, to the dither processor 12.

Figures 24A, 24B, 25A, 25B, 25C:
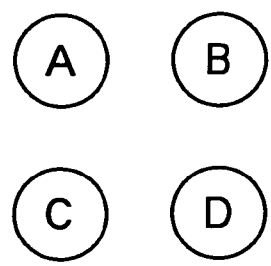
FIGS. 24A and 24B are drawings for explaining the operation of the dither processor according to Embodiment 3.
FIGS. 25A to 25C are drawings showing an example of dither processing according to Embodiment 3.

FIGS. 24A and 24B show the operation of the dither processor 12. FIG. 24A shows an area (consisting of 2×2 pixels) to which a dither processing is applied, FIG. 24B shows an example of a dither pattern.

The dither processor 12 adds the values for the respective positions shown by the dither pattern shown in FIG. 24B, to the pixels A to D of (n+α)-bits shown in FIG. 24A, and then quantizes the results of the addition to produce n-bit image data. The dither processing can be regarded as a type of quantization in a broad sense.

To each of the pixels of the (n+α)-bit image data Do, the corresponding value of the dither pattern is added for each area shown in FIG. 24A, and the results of the addition are quantized, to produce n-bit image data Dp.

The dither processing may not be restricted to the addition of the values of the dither pattern shown in FIG. 24B, but any other dither processing using a different dither pattern with a different size or values may be used.

The operation of the dither processor 12 will next be described using an example.

FIGS. 25A to 25C show an example of dither processing. FIG. 25A shows tones of pixels A to D in an area (consisting of 2×2 pixels) of the image data Do, FIG. 25B shows tones obtained after the addition of the values for the respective positions of the dither pattern shown in FIG. 24B, to the pixels in the area shown in FIG. 25A, FIG. 25C shows the tones obtained by quantizing the tones shown in FIG. 25B.

Description is made of an example in which dither processing converts (n+2)-bit image data Do to n-bit image data Dp.

The dither processor 12 receives image data Do from the tone resolution expander 3. It is assumed that the tones in an area of the input image data Do have the following values: Do(A)=17, Do(B)=21, Do(C)=3, Do(D)=9, as shown in FIG. 25A.

Values for the respective positions of the dither pattern shown in FIG. 24B are added to the pixels A to D shown in FIG. 25A. The tones of the pixels A to D will become as shown in FIG. 25B, namely, A:17+0=17, B:21+1=22, C:3+2=5, F:9+3=12.

The respective tones shown in FIG. 25B for the pixels A to D are quantized by two bits, and the results of the quantization are output as image data Dp. That is, A:17/4=4, B:22/4=5, C:5/4=1, D:12/4=3.

By using the dither processing to convert the tone resolution-expanded (n+α)-bit image data to n-bit image data, image with smoothed tone steps can be displayed on an n-bit display unit, using pseudo gray levels.

Figure 26:
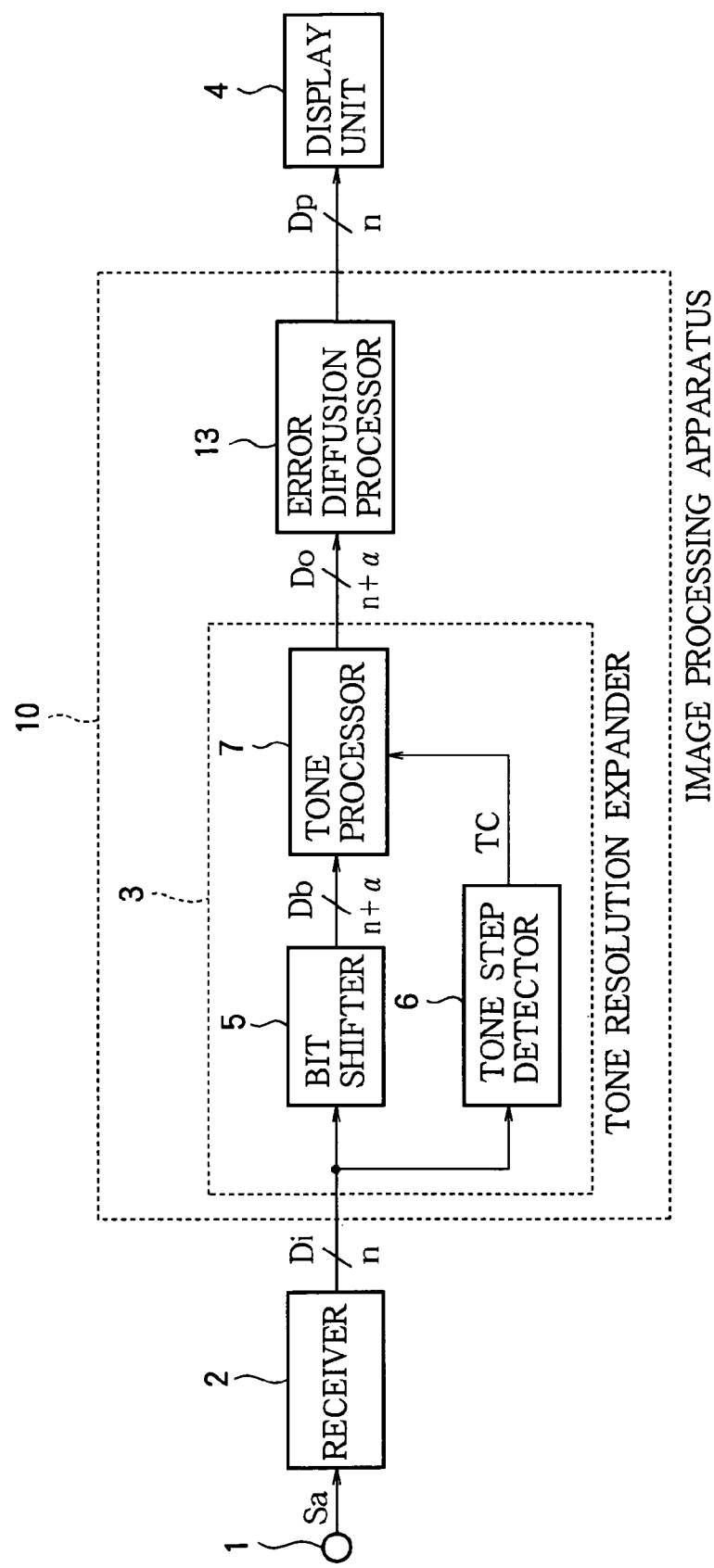
FIG. 26 is a drawing showing the configuration of an image display apparatus according to Embodiment 3.

In place of the dither processing, error diffusion processing may be used as shown FIG. 26, to convert the (n+α)-bit image data Do to the n-bit image data Dp. The error diffusion processing may also be regarded as one type of quantization in a broad sense.

The error diffusion processor 13 outputs the image data Dp obtained by adding the diffusion errors generated when the (n+α)-bit image data Do for each pixel is quantized to n-bit image data, to the neighboring pixels.

It is also possible to use a different type of error diffusion processing in which the quantization errors are multiplied with weighting coefficients before being added to neighboring pixels.

Figures 27A, 27B, 27C, 27D:
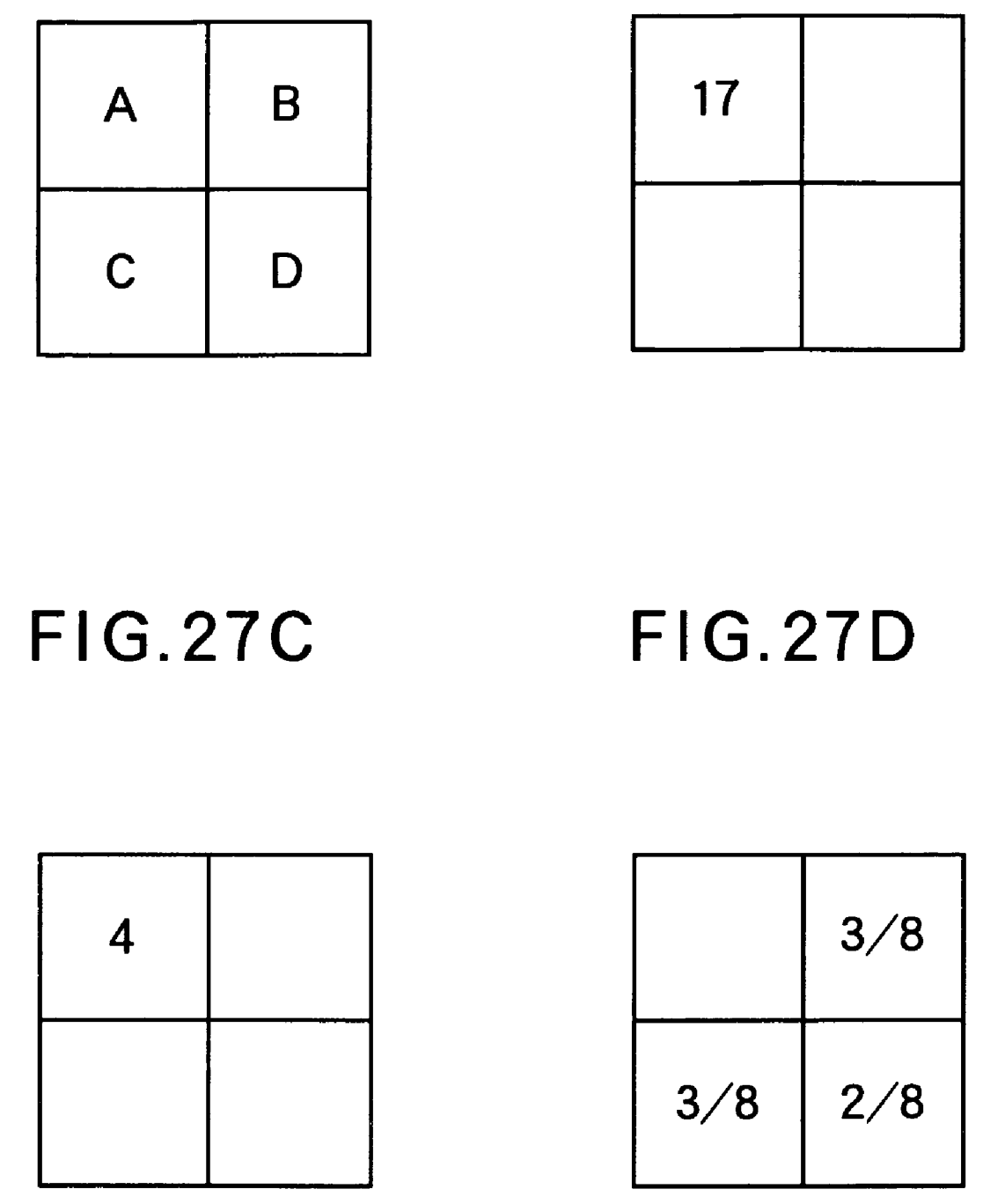

FIGS. 27A to 27D show an example of error diffusion processing. FIG. 27A shows four pixels A to D arranged in an area consisting of 2×2 pixels. In this example, it is assumed that any quantization error resulting from quantization of the pixel A is added to the pixels B, C and D, which are to be quantized after the pixel A. FIG. 27B shows the tone of pixel A which is a sum of the data Do from the tone resolution expander 3 and any accumulated error resulting from quantization of previously processed pixels. FIG. 27C shows a tone obtained by quantizing the tone of the pixel A shown in FIG. 27B. FIG. 27D shows respective parts of the quantization error resulting from the quantization of the pixel A, and which are to be added to the pixels B, C, D.

When the error diffusion processor 13 receives the image data Do for the pixel A from the tone resolution expander 3, any accumulated quantization error resulting from quantization of previously processed pixels (pixels that were subjected to error diffusion earlier), which is stored in the error diffusion processor 13, is added to the tone of the data Do from the tone resolution expander 3. The resultant tone of the pixel A is assumed to be as shown in FIG. 27B, namely: Do(A)=17.

The tone of the pixel A shown in FIG. 27B is quantized, so that the tone as a result of the quantization is as shown in FIG. 27C, namely A:17/4=4. The quantization error as a result of the quantization of the pixel A is given by: 17−4×4=1. This quantization error is divided for allocation or addition to the pixels B, C, D, as shown in FIG. 27D. In the illustrated example, ⅜ of the quantization error is allocated to each of the pixel B (on the right side of the pixel A) and the pixel C (below the pixel A), while ⅔ of the quantization error is allocated to the pixel D (obliquely adjacent, i.e, at a position one line blow and one column (pixel position) to the right). If, for each of the pixels B, C and D, there is any accumulated quantization error resulting from quantization of previously processed pixels, the allocated part of the quantization error from the pixel A is added to the accumulated quantization error, which is thereby updated. The accumulated quantization error for each pixel is stored for subsequent processing.

The tone of the pixel A as shown in FIG. 27C is output from the error diffusion processor 13 as the data Dp.

By using the error diffusion to convert the tone resolution-expanded (n+α)-bit image data to the n-bit image data, image with smoothed tone steps can be displayed on an n-bit display unit, using pseudo gray levels.

Embodiment 4

Figure 28:
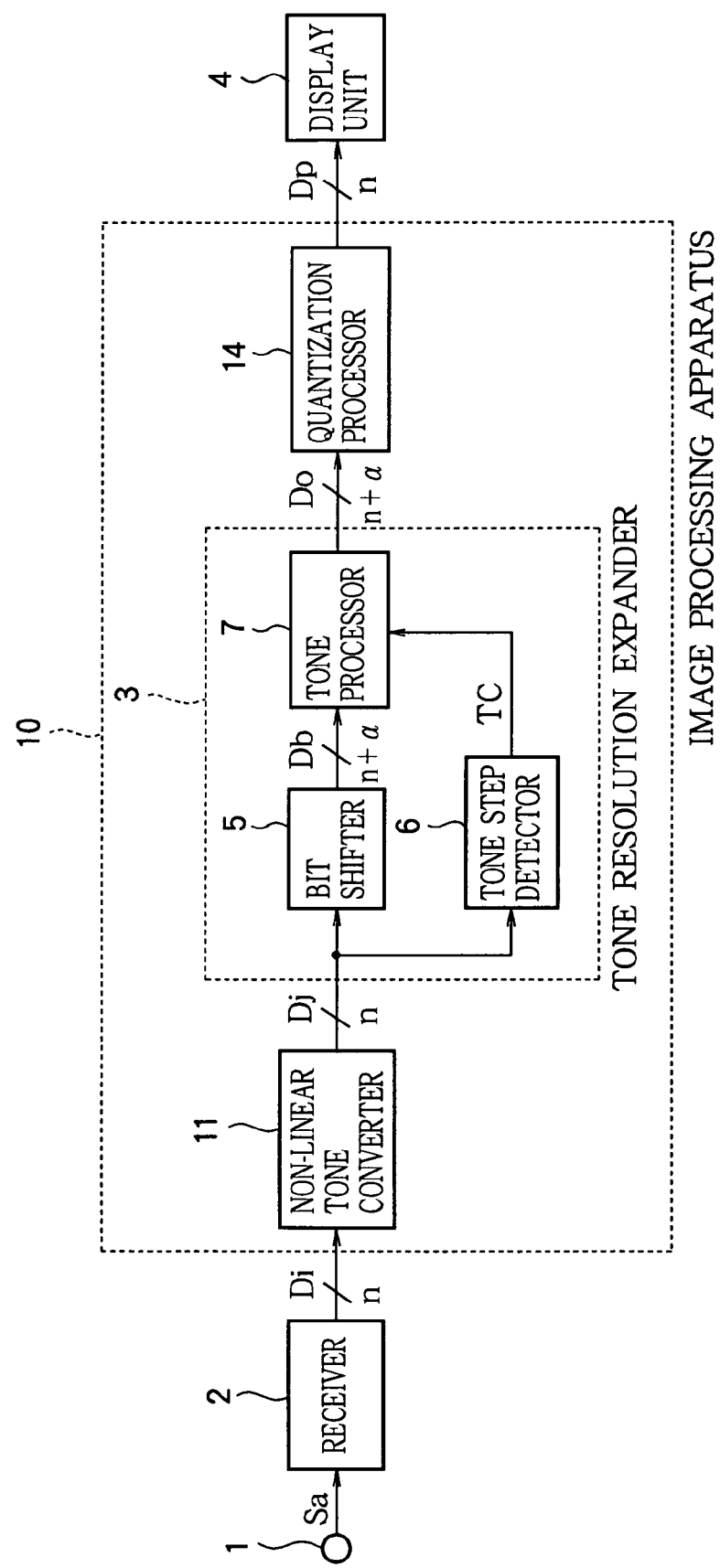
FIG. 28 is a drawing showing the configuration of an image display apparatus according to Embodiment 4.

FIG. 28 shows an image display apparatus according to Embodiment 4 of the present invention. The image display apparatus according to Embodiment 4 comprises an image processing apparatus comprising an input terminal 1, a receiver 2, and an image processor 10, and a display unit 4. An analog image signal Sa is input via the input terminal 1 to the receiver 2, which converts the analog image signal Sa to n-bit image data Di, and outputs the n-bit image data Di to the image processor 10. The image processor 10 comprises a non-linear tone converter 11, a tone resolution expander 3, and a quantization processor 14, and applies image processing such as non-linear tone conversion and tone resolution expansion, and quantization processing, to the n-bit image data Di, and outputs n-bit image data Dp to the display unit 4. The non-linear tone converter 11 applies non-linear tone conversion to the image data Di, and outputs n-bit image data Dj to the tone resolution expander 3. The tone resolution expander 3 comprises a bit shifter 5, a tone step detector 6, and a tone processor 7, and converts the n-bit image data Dj to (n+α)-bit image data Do, and outputs (n+α)-bit image data Do to the quantization processor 14. The quantization processor 14 converts the (n+α)-bit image data Do to n-bit image data by quantization, and outputs the n-bit image data Dp to the display unit 4. The display unit 4 display an image based on the n-bit image data Dp.

The operation of the image display apparatus of Embodiment 4 is similar to that of the image display apparatus of Embodiments 1 to 3. The description previously made in connection with Embodiments 1 to 3 is applicable to Embodiment 4 as long as it does not contradict the description given below.

As was described in connection with Embodiment 2, the tone resolution expander 3 detects a tone step contained in the n-bit image data Di outputs from the non-linear tone converter 11, and outputs (n+α)-bit image data Do obtained by means of smoothing the image data in the region having been found to contain a tone step, to the quantization processor 14.

The operation of the quantization processor 14 will next be described using an example.

Figure 29:
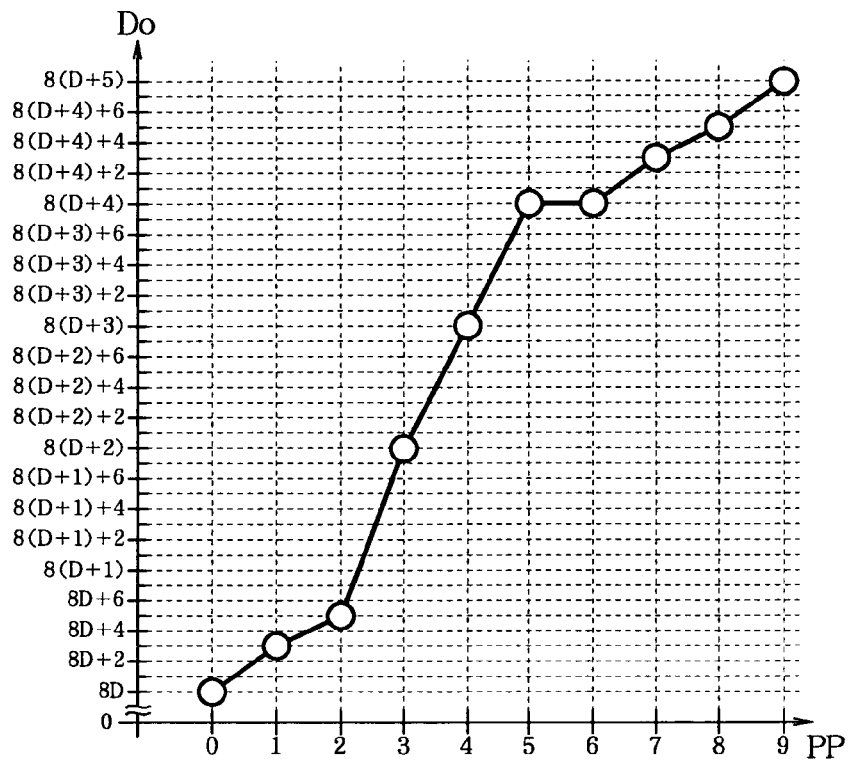
FIG. 29 is a drawing showing an example of quantization processing according to Embodiment 4, and showing image data Do output from the tone resolution expander 3, described in connection with an example of FIG. 15 to FIG. 18.
Figure 30:
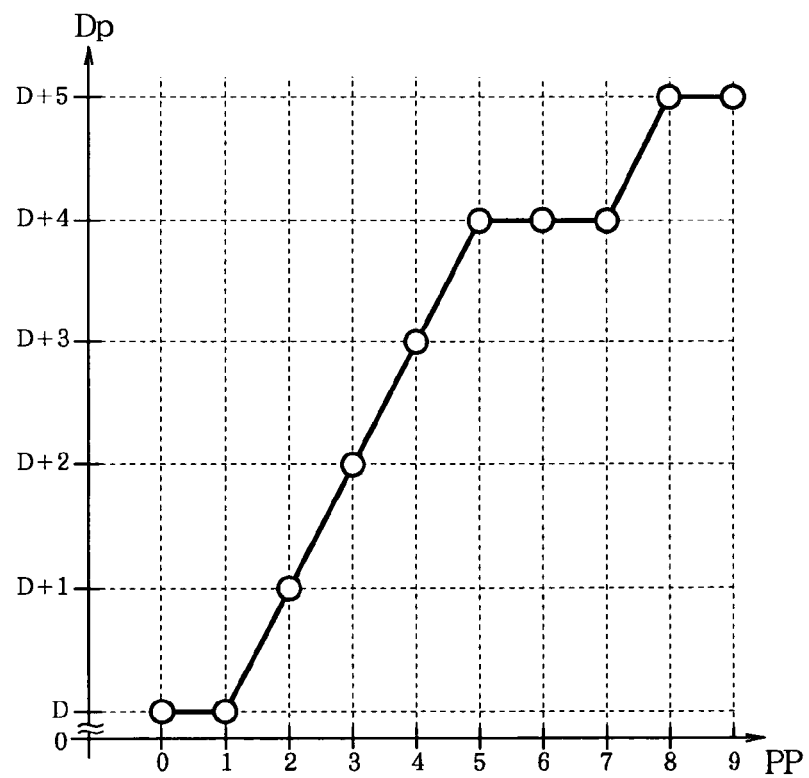
FIG. 30 is a drawing showing image data Dp obtained by quantizing the (n+3)-bit image data Do to n-bit image data, by means of the quantization processor 22, in an example of quantization processing according to Embodiment 4.

FIG. 29 and FIG. 30 show an example of quantization. FIG. 29 shows the image data Do output from the tone resolution expander 3 described in connection with FIG. 15 to FIG. 18, and FIG. 30 shows the image data Dp output from the quantization processor 22 which quantizes the (n+3)-bit image data Do shown in FIG. 29 to n-bit image data.

The operation of the quantization processor 14 will now be described with reference to FIG. 28 to FIG. 30.

As was described in connection with the example of FIG. 15 to FIG. 18, the tone resolution expander 3 detects a tone step contained in the image data Dj output from the non-linear tone converter 11, and smoothes the image data in the region having been found to contain a tone step, and outputs the (n+3)-bit image data Do shown in FIG. 29, having been smoothed in the region having been found to contain a tone step, to the quantization processor 14. The quantization processor 14 the (n+3)-bit image data Do to n-bit image data. The tones at the pixel positions 0 to 9 are as follow: Dp(0)=D, Dp(1)=D, Dp(2)=D+1, Dp(3)=D+2, Dp(4)=D+3, Dp(5)=D+4, Dp(6)=D+4, Dp(7)=D+4, Dp(8)=D+5, Dp(9)=D+5.

The quantization is achieved by dividing the data Do by 8, and omitting the fraction if it less than 0.5, and counting the fraction if it is not less than 0.5.

By quantizing the tone resolution-expanded (n+α)-bit image data, images with the tone steps having been smoothed can be displayed on an n-bit display unit.

In place of the quantization processor 14, a dither processor 12 or an error diffusion processor 13 described with reference to Embodiment 3 may be used to convert the (n+α)-bit image data Do to n-bit image data Dp. The dither processing and error diffusion are types of quantization processing as was described above.

Embodiment 5

Figure 31:
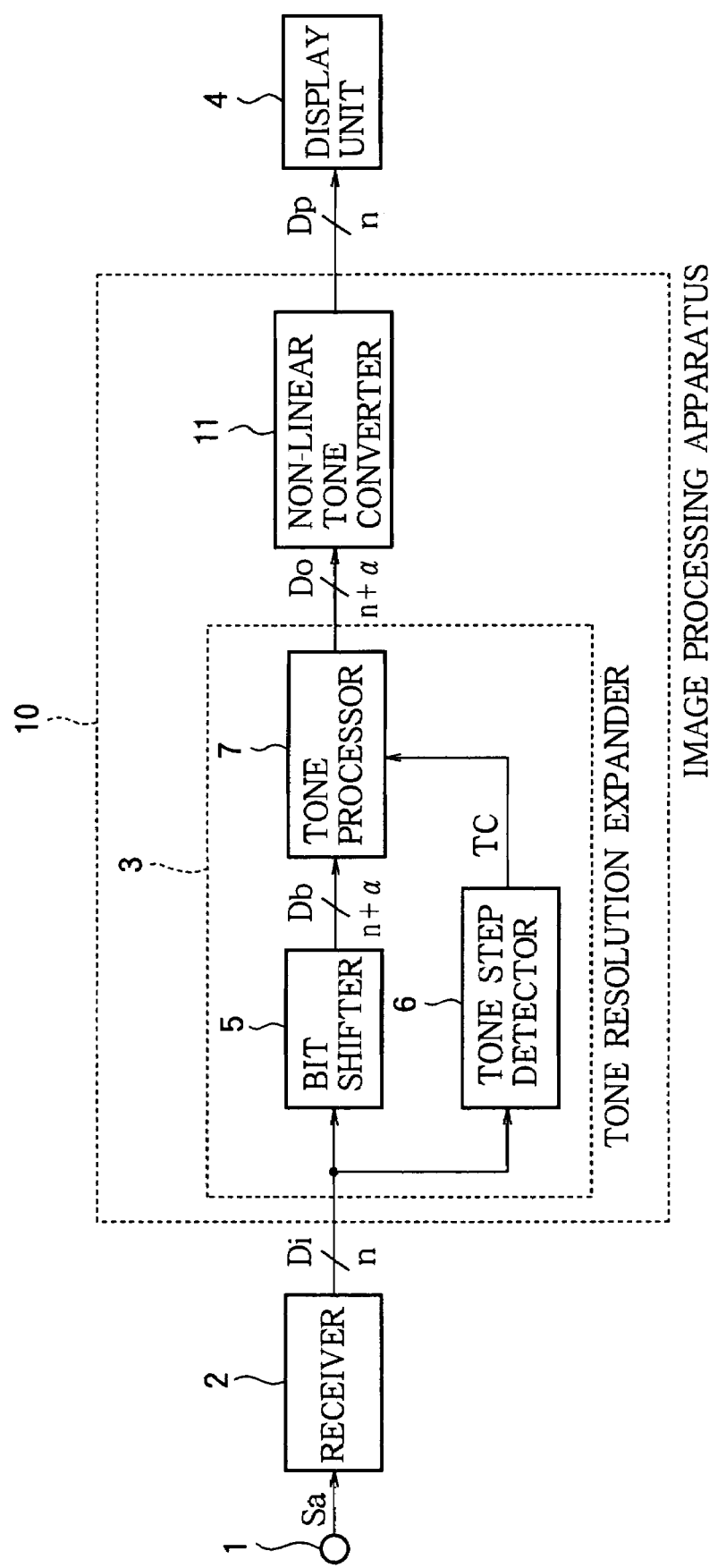
FIG. 31 is a drawing showing the configuration of an image display apparatus according to Embodiment 5.

FIG. 31 shows an image display apparatus according to Embodiment 5 of the present invention. The image display apparatus according to Embodiment 5 comprises an image processing apparatus comprising an input terminal 1, a receiver 2, and an image processor 10, and a display unit 4. An analog image signal Sa is input via the input terminal 1 to the receiver 2, which converts the analog image signal Sa to n-bit image data Di, and outputs the n-bit image data Di to the image processor 10. The image processor 10 comprises a tone resolution expander 3 and a non-linear tone converter 11, and applies image processing such as tone resolution expansion and tone conversion, to the input n-bit image data Di, and outputs n-bit image data Dp to the display unit 4. The tone resolution expander 3 comprises a bit shifter 5, a tone step detector 6 and a tone processor 7, and converts the n-bit image data Di to (n+α)-bit image data Do, and outputs the (n+α)-bit image data Do to the non-linear tone converter 11. The non-linear tone converter 11 applies non-linear tone conversion to the (n+α)-bit image data Do, and outputs the n-bit image data Dp to the display unit 4. The display unit 4 displays an image based on the n-bit image data Dp.

The operation of the image display apparatus of Embodiment 5 is similar to that of the image display apparatus of Embodiments 1 to 4. The description previously made in connection with Embodiments 1 to 4 is applicable to Embodiment 5 as long as it does not contradict the description given below.

Figure 32A:
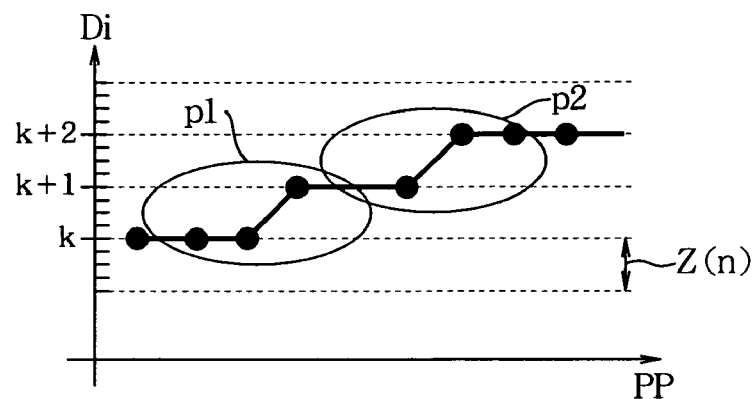
FIGS. 32A to 32C are drawings for explaining the operation of an image display apparatus according to Embodiment 5.
Figure 32B:
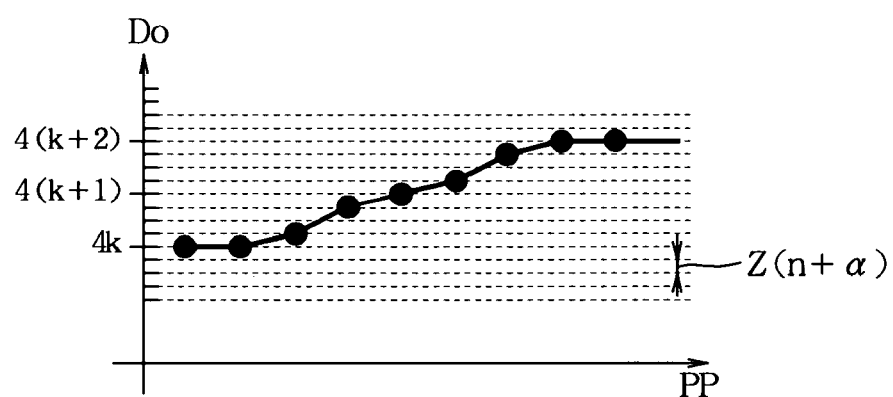
Figure 32C:
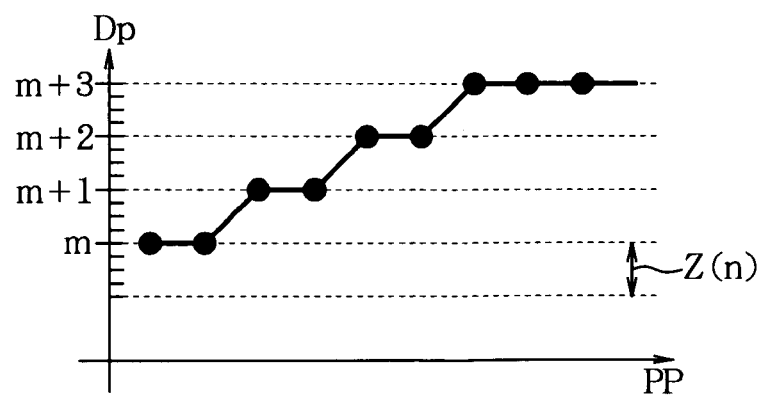

FIGS. 32A to 32 are diagrams for explaining the operation of the image display apparatus according to Embodiment 5. FIG. 32A shows the n-bit image data Di output from the receiver 2, FIG. 32B shows the (n+α)-bit image data Do output from the tone resolution expander 3 which applies tone resolution expansion to the image data Di shown in FIG. 32A, FIG. 32C shows the n-bit image data Dp output from the non-linear tone converter 11 which applies tone conversion to the image data shown in FIG. 32B.

The operation of the image display apparatus according to Embodiment 5 will now be described in detail with reference to FIG. 31 and FIGS. 32A to 32C.

The receiver 2 converts the analog image signal Sa to the n-bit image data Di shown in FIG. 32A, and outputs the n-bit image data Di to the tone resolution expander 3.

The tone resolution expander 3 detects the region p1 and region p2 shown in FIG. 32A, as containing a tone step, and smoothes the image data in the regions p1 and p2 having been found to contain a tone step, and outputs the image data Do shown in FIG. 32B to the non-linear tone converter 11.

Figure 33:
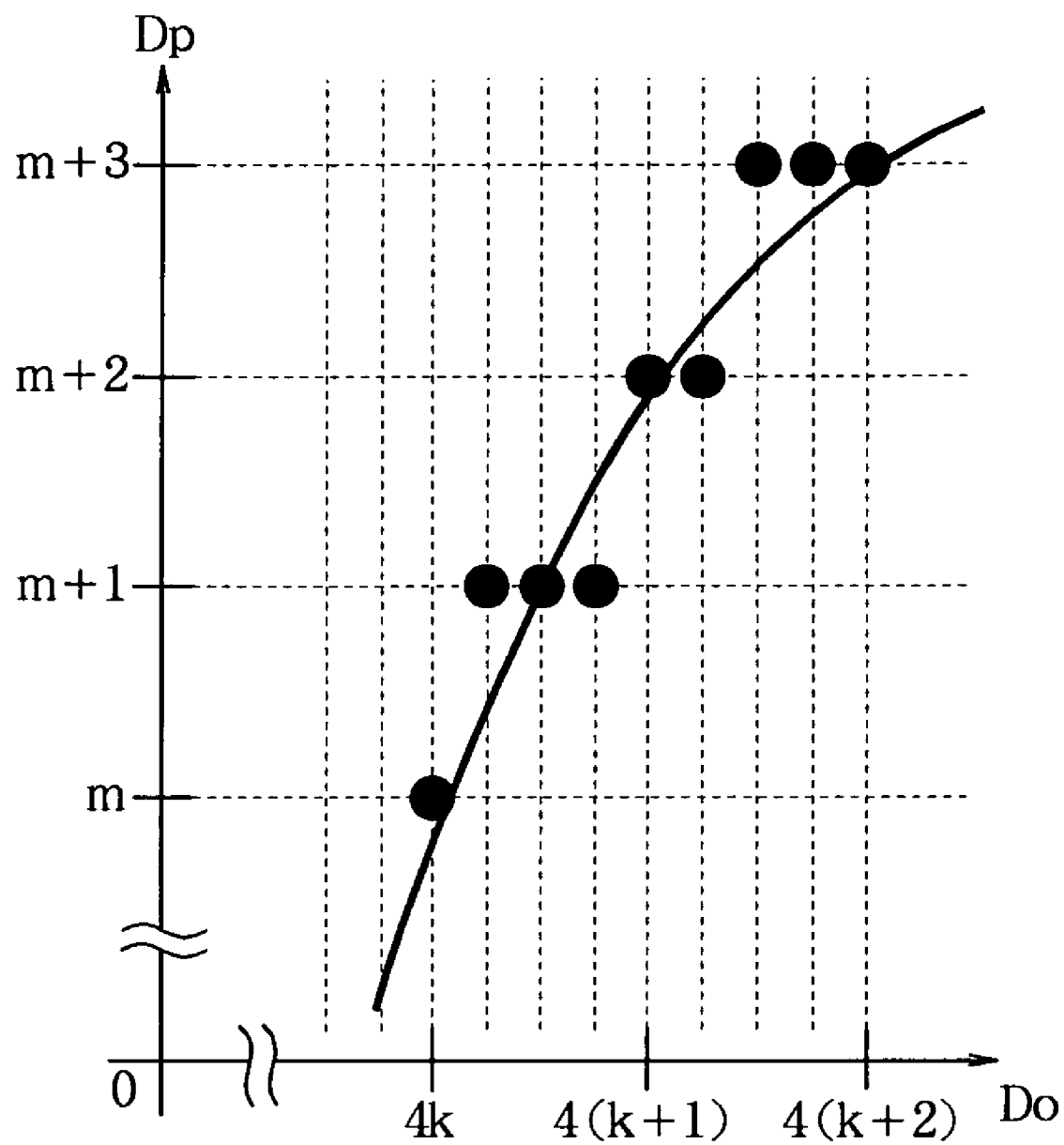
FIG. 33 is a drawing showing the operation of the non-linear tone converter according to Embodiment 5.

FIG. 33 shows an example of the input-output relationship of the non-linear tone converter 11. The horizontal axis represents the tone of the (n+α)-bit input image data Do of the non-linear tone converter 11, while the vertical axis represents the tone of the n-bit output image data Dp.

The non-linear tone converter 11 converts the image data Do shown in FIG. 32B to the image data Dp shown in FIG. 32C, according to the input-output relationship shown in the graph of FIG. 33, and outputs the image data Dp to the display unit 4. The quantization is involved in the tone conversion, and the results of the tone conversion are as plotted by black dots in FIG. 33. In accordance with the graph of FIG. 33, the non-linear tone converter 11 converts the tone $4k$ of the image data Do, to tone m; tones $4k+1$ to $4k+3$ to tones m+1; tones $4(k+1)$ to $4(k+1)+1$ to tone m+2; tones $4(k+1)+2$ to $4(k+2)$ to tone m+3, and the tone obtained as a result of the tone conversion is output as the image data Dp.

By applying tone resolution expansion to the image data input to the non-linear tone converter 11, it is possible to reduce the number of tones which do not appear in the image data after the non-linear tone conversion.

The processing at the receiver 2 and the image processor including the tone resolution expander 3 can be implemented by software, i.e., a programmed computer.

The present invention can be applied to image display apparatus, such as liquid crystal television, or plasma display television.

What is claimed is:

1. An image processing apparatus comprising:
   a tone step detector for detecting whether a tone of an n-bit image data varies gradually, with n being a positive integer, and generating a tone processing control signal indicating that a tone step in a region in which the detection is made;
   a bit shifter for bit-shifting the n-bit image data by α bits, with α being a positive integer, to generate (n+α)-bit image data;
   a tone processor for generating (n+α)-bit image data by smoothing the (n+α)-bit image data generated by the bit shifter, in a region where the tone processing control signal indicates that a tone step is contained.

2. The image processing apparatus according to claim 1, wherein said tone step detector detects a monotonically increasing or monotonically decreasing region satisfying a condition of Y/X<1, where X represents a predetermined number of pixels, and Y represents the variation in the tone over X pixels, and generates the tone processing control signal indicating that a tone step is contained in the detected region.

3. The image processing apparatus according to claim 2, wherein the tone step detector detects whether the tone varies stepwise within a region consisting of a predetermined number of consecutive pixels, and generating the tone processing control signal indicating that a tone step is contained in the region in which the detection is made.

4. The image processing apparatus according to claim 3, wherein said tone step detector comprises
   a first derivative calculator for calculating a first derivative data of the n-bit image data, and
   a judgment unit for judging that a region which contains a tone step at which the first derivative data for two consecutive pixels are both "1," or both "−1," and parts which are on front and rear sides of the tone step, and where the first derivative data is "0" is a step region, and generating a tone step control signal indicating that a tone step is contained in the region for which the judgment is made.

5. The image processing apparatus according to claim 2, wherein said tone step detector detects whether the tone varies by Ds (Ds being a positive integer, not smaller than 2, and not greater than Dsmax, where Dsmax is a positive integer) in the middle of gradual variation in a region consisting of a predetermined number of consecutive pixels, and generates the tone processing control signal indicating that a tone step is contained in the region in which the detection is made.

6. The image processing apparatus according to claim 5, wherein said tone step detector comprises:
   a first derivative detector for calculating a first derivative data of the n-bit image data; and a judgment unit for judging that a region is a tone step region if it contains a tone step at which the first derivative data for two consecutive pixels are both "Ds," (Ds being a positive integer not smaller than "2," and not greater than "Dsmax," where Dsmax is a positive integer), and parts which are on front and rear sides of the tone step where the first derivative data for two consecutive pixels are both "Ds," and in which the first derivative data is "0" or "1," or it contains a tone step at which first derivative data for two consecutive pixels are both "−Ds," and parts which are on front and rear sides of the tone step where the first derivative data for two consecutive pixels are both "−Ds," and in which the first derivative data is "0" or "−1," and generating a tone step control signal TC indicating that a tone step is contained in the region for which the detection is made.

7. The image processing apparatus according to claim 1, further comprising a receiver for converting a received analog image data into digital image data to generate the n-bit image data; wherein
said tone step detector detects whether the tone of the n-bit image data output from the receiver varies gradually; and
said bit shifter bit-shifts the n-bit image data output from the receiver.

8. The image processing apparatus according to claim 7, further comprising a quantization means for performing quantization on the (n+α)-bit image data generated by the tone processor, to generate n-bit image data.

9. The image processing apparatus according to claim 8, wherein said quantization means performs the quantization using dither processing to generate pseudo gray levels, by adding values of a dither pattern to the (n+α)-bit image data generated by the tone processor.

10. The image processing apparatus according to claim 8, wherein said quantization means performs the quantization by using error-diffusion processing to generate pseudo gray levels by adding quantization errors to the neighboring pixels.

11. An image display apparatus comprising:
the image processing apparatus according to claim 8, and
an image display unit for displaying an image based on the n-bit image data generated by the image processing apparatus.

12. The image processing apparatus according to claim 7, further comprising a non-linear tone converter for performing non-linear tone conversion on the (n+α)-bit image data generated by the tone processor, to generate n-bit image data.

13. The image processing apparatus according to claim 1, further comprising:
a receiver converting a received analog image data into digital image data to generate a first n-bit image data; and
a non-linear tone converter for performing non-linear tone conversion on the first n-bit image data generated by the receiver, to generate a second n-bit image data;
wherein
said tone step detector detects whether the tone of the second n-bit image data output from the non-linear tone converter varies gradually; and
said bit shifter bit-shifts the second n-bit image data output from the non-linear converter.

14. The image processing apparatus according to claim 13, further comprising a quantization means for performing quantization on the (n+α)-bit image data generated by the tone processor, to generate n-bit image data.

15. The image processing apparatus according to claim 14, wherein said quantization means performs the quantization using dither processing by adding values of a dither pattern to the (n+α)-bit image data generated by the tone processor to generate pseudo gray levels.

16. The image processing apparatus according to claim 14, wherein said quantization means performs the quantization using error diffusion processing by adding quantization errors to the neighboring pixels to generate pseudo gray levels.

17. An image display apparatus comprising:
the image processing apparatus according claim 1, and
a display unit for displaying an image based on the (n+α)-bit image data generated by the image processing apparatus.

18. An image processing method comprising:
a tone step detecting step for detecting whether a tone of an n-bit image data varies gradually, with n being a positive integer, and generating a tone processing control signal indicating that a tone step in a region in which the detection is made;
a bit-shifting step for bit-shifting the n-bit image data by α bits, with α being a positive integer, to generate (n+α)-bit image data;
a tone processing step for generating (n+α)-bit image data by smoothing the (n+α)-bit image data generated by the bit shifting step, in a region where the tone processing control signal indicates that a tone step is contained.

19. The image processing method according to claim 18, further comprising an image receiving step for converting a received analog image data into digital image data to generate the n-bit image data; wherein
said tone step detecting step detects whether the tone of the n-bit image data generated by the image receiving step varies gradually; and
said bit-shifting step bit-shifts the n-bit image data generated by the image receiving step.

20. The image processing method according to claim 18, further comprising:
an image receiving step converting a received analog image data into digital image data to generate a first n-bit image data; and
a non-linear tone converting step for performing non-linear tone conversion on the first n-bit image data generated by the image receiving step, to generate a second n-bit image data;
wherein
said tone step detecting step detects whether the tone of the second n-bit image data generated by the non-linear tone converting step varies gradually; and
said bit-shifting step bit-shifts the second n-bit image data generated by the non-linear converting step.

21. An image display method comprising:
the image processing method according to claim 18, and
an image display step for displaying an image based on the (n+α)-bit image data generated by the image processing method.

* * * * *